United States Patent [19]

Lalvani

[11] Patent Number: 5,448,868
[45] Date of Patent: Sep. 12, 1995

[54] PERIODIC SPACE STRUCTURES COMPOSED OF TWO NODAL POLYHEDRA FOR DESIGN APPLICATIONS

[76] Inventor: Haresh Lalvani, 164 Bank St., Apt. 2B, New York, N.Y. 10014

[21] Appl. No.: 964,344

[22] Filed: Oct. 21, 1992

[51] Int. Cl.⁶ .......................................... E04H 12/00
[52] U.S. Cl. .................................. 52/648.1; 52/81.1; 52/DIG. 10
[58] Field of Search ...................... 52/645, 646, 648.1, 52/DIG. 10, 81.1, 81.4, 81.5

[56] References Cited

U.S. PATENT DOCUMENTS

| | | | |
|---|---|---|---|
| 3,611,620 | 10/1971 | Perry | 52/81.1 X |
| 3,646,718 | 3/1972 | McKenna | 52/81.1 X |
| 3,970,301 | 7/1976 | Lehmann | 52/648.1 X |
| 4,551,726 | 11/1985 | Berg | 52/81.1 X |
| 4,682,450 | 7/1987 | Diamond | 52/81.1 |
| 4,723,382 | 2/1988 | Lalvani | 52/648.1 X |
| 5,007,220 | 4/1991 | Lalvani | 52/648.1 X |
| 5,036,635 | 8/1991 | Lalvani | 52/DIG. 10 X |
| 5,046,988 | 9/1991 | Bennett | 52/DIG. 10 X |
| 5,155,951 | 10/1992 | Lalvani | 52/DIG. 10 X |
| 5,168,677 | 12/1992 | Pronsato et al. | 52/81.1 |
| 5,169,352 | 12/1992 | Petersen | 52/DIG. 10 X |
| 5,265,395 | 11/1993 | Lalvani | 52/648.1 |

FOREIGN PATENT DOCUMENTS 4330140 11/1992 Japan ........................ 52/81.1

OTHER PUBLICATIONS

Domebook II, Geodesic Geometry, pp. 9–10, 1971.

*Primary Examiner*—Peter M. Cuomo
*Assistant Examiner*—Suzanne L. Dino

[57] ABSTRACT

Families of periodic space structures, configurations, labyrinths and space frames based on seven different known periodic space grids composed of one edge-length and even-sided polygons. The space structures have two different polyhedra corresponding to the vertices of the source grids. The space labyrinths are characterized by a continuous surface having two types of vertices and dividing space into two parts. The space frames have one type and length of strut and two different shapes of nodes. The structures have cross-disciplinary applications in the design and scientific fields. In architecture and design fields, applications for building systems one earth or outer space, architectural space layouts, environmental sculptures, playground structures, honeycomb structures, toys, puzzles, model-kits, etc. are possibilities. The space labyrinths, besides their architectural applications, provide model geometries for the design of synthetic molecular filters, micro-filters for purification of liquids and gases, and designs for micro-screens.

13 Claims, 24 Drawing Sheets

PERIODIC SPACE STRUCTURES COMPOSED OF TWO NODAL POLYHEDRA FOR DESIGN APPLICATIONS

FIELDS OF INVENTION

Periodic space labyrinth structures having a continuous surface composed of regular polygons and two different nodal polyhedral spaces which divide space into inside and outside without self intersections. The labyrinths and related space-fillings and space frames can be used for various design applications including architectural and building structures on earth and in outer space, designs for honeycomb-type structures, micro-filters used for purification of fluids, designs for molecular filters like designer-zeolites, and miscellaneous applications at micro and macro scales requiring the use of new periodic geometries.

BACKGROUND OF THE INVENTION

With industrialization, the need for the design of building systems using a few prefabricated components has led to the search for new modular systems. Invariably, this search has led to building systems based on repetitive, or periodic, geometries where a unit or a cluster of units is translated (moved) in space in one, two or three directions. The economy of design, manufacturing, analysis, costing, and construction is built-in since only the basic module, and how this module fits with others, needs to be resolved in greater detail. There are design issues of overall organization and composition which require consideration, but the advantages of modularity are compelling. This type of thinking has led to the design of many periodic building systems, the most notable being space frames like Buckminster Fuller's "octet truss", Menringhausen's Mero system, Peter Pearce's universal node, and many others which are mostly design variations but retain the underlying geometry, symmetry and topology of a few types of periodic symmetries. Many of such periodic building systems have been in practice and have led to an upsurge of interest in the search for new and innovative geometries, new ways to define and organize architectural space, new structural systems and new ways to construct. There is a constant need to find new structures and configurations.

Among periodic geometries, regular (Platonic) and semi-regular (Archimedean) polyhedra have provided a basis for deriving various types of building systems. The works of the architects Tyng, Hecker, Safdie, Baer, Critchlow, Strutt, Giorgini and Gabriel are cited. Among the geometries using regular polygons (planar polygons with equal edges and angles), space labyrinths composed of regular faces are an attractive class of spatial configurations with interesting applications in various fields. Space labyrinths are a class of space structures which are characterized by a continuous infinite surface which divides space into two parts, inside and outside, without self-intersections. Periodic space labyrinths composed of planar regular polygons and having one one type of vertex, are known from the prior work of Petrie and Coxeter, and Burt et al where they were alternatively described as infinite polyhedra in such labyrinths, every vertex of the labyrinth is alike, i.e. the number and types of polygons meeting at every vertex is the same. Burt has proposed the use of his infinite polyhedra for very large spans on the kilometer scale, and has also suggested plate-type, cylindrical and spherical use of such labyrinths for architecture.

Prior related patents include U.S. Pat. No. 2,803,088 to J. A. Swann; U.S. Pat. No. 3,600,825 to P. Pearce; U.S. Pat. No. 3,632,147 to J. Finger; U.S. Pat. No. 3,91,360 to P. M. Baldwin; U.S. Pat. No. 3,974,600 to P. Pearce, U.S. Pat. No. 4,129,975 to R. J. Gabriel; and U.S. Pat. No. 4,183,190 to J. A. Bance.

This applications deals with new periodic labyrinths, also composed of regular faces, but having two types of vertices. The two types of vertices alternate with one another throughout the labyrinth, and the labyrinths are derived from regular and semi-regular polyhedra of tetrahedral, octahedral symmetries and prismatic. Such labyrinths are not known in prior art. Since the geometries of such labyrinths are new, applications based on these geometries will also be new. The labyrinths can be easily converted into "solid" space-fillings by filling in the open faces and open cells, thereby converting the labyrinth from a continuous surface into a close-packing of various polyhedra.

Both the labyrinths and the derived space-fillings provide a basis for novel architectural and building systems. Further, as described herein, the space labyrinths are composed of nodal polyhedra and connector polyhedra which can easily be converted into space frames composed of nodes and struts by elongating the connector polyhedra and developing suitable connection devices.

In addition to the field of architecture and design, the new geometries may be used at microscopic levels in the design of filters and sieves. Car filters, windows that "breathe", sieves for fluids, are candidate applications. Designed molecular sieves for chemical purification in industrial processes are other possibilities.

SUMMARY OF THE INVENTION

Accordingly, the primary object of the invention is to provide families of periodic space structures composed of regular faces and having two types of vertices, and which can extend indefinitely. These are based on seven different types of periodic space grids.

Another object of the invention is to provide a family of periodic space labyrinths. Each labyrinth is composed of regular faces and extends indefinitely without intersecting itself and yet dividing space into inside and outside. The labyrinths have two types of vertices, are composed of two types of nodal polyhedra which are connected by one type of connector polyhedron. The nodal polyhedra are selected from regular and semi-regular polyhedra, and the connector polyhedra have regular faces. The labyrinths are also based on seven types of periodic space grids.

Another object of the invention is to provide families of periodic space-fillings, also having two types of vertices and composed of various polyhedra with regular faces. These are also based on seven types of periodic space grids.

Another object of the invention is to provide families of periodic space frames composed of two types of nodes and one type of strut. The struts are elongated versions of the connector pieces used in the labyrinths. These are also based on seven types of periodic space grids.

Another object of the invention is to provide families of space labyrinths with elongated or shortened connector pieces and symmetric nodal polyhedra with different edge lengths.

Another object of the invention is to provide families of space structures, labyrinths, space-fillings and space frames where the restruction on the regularity of faces can be relaxed as long as symmetry of the faces and the topology of the regular and semi-regular polyhedra is retained. That is, as long as the same polygons have the same number of sides and the number meet a vertex, the lengths of the edges can be varied to two or three or more lengths.

The foregoing space labyrinths are derived by placing a pair of regular or semi-regular polyhedra, herein termed nodal polyhedra, on the vertices of seven types of underlying periodic space grids. The nodal polyhedra are connected by matching polyhedral pieces, herein termed connector polyhedra, which correspond to the edges of the underlying space grids. The faces common to the nodal and connector polyhedra are removed to produce a continuous labyrinth like surface which divides space into two spaces, inside and outside. The nodal polyhedra belong to the symmetries determined by a regular tetrahedron, octahedron (or cube), and a square prism. The underlying space grids are derived from various subdivisions of the simple cubic grid and the grid defined by the edges of space-filling rhombic dodecahedra. All seven grids have only edge-length and are composed of one or two type of vertices.

The foregoing space-fillings are derived from the labyrinths by inserting regular polygonal faces in the openings of the labyrinths thereby converting the continuous surface into an array of various close-packed polyhedra with regular faces.

The foregoing space frames are derived by elongating the connector pieces of labyrinths, converting the nodal polyhedra into nodes and connector polyhedra into struts, and coupling the nodes and struts in a desired manner.

The space labyrinths can be used for architectural spaces, building structures, honeycomb structures, micro-filters and for designing molecular or chemical sieves. The space-fillings disclosed here can be converted into various architectural and design applications at macroscopic and microscopic levels. The space frames provide alternatives to the space frames in use. Other applications include toys, games, environmental sculptures, interior design, model-kits. An interesting application of the labyrinths is in the design of synthetic molecules like zeolites, i.e. "designer zeolites", used in chemical purification in various industrial processes. The purification of oil is an example.

Other objects and salient features of the present invention will become apparent from the following detailed description, which taken in conjunction with the annexed drawings, discloses preferred embodiments of the invention.

DRAWINGS

Referring now to the drawings which form a part of this original disclosure

FIGS. 1–8 show the seven periodic space grids used for deriving the labyrinths.

FIG. 1 shows grid Type A, a simple cubic grid composed of one type of vertex having cubic symmetry.

FIG. 2 shows grid Type B, a body-centred cubic grid obtained by joining its center to its eight vertices composed of one type of vertex having cubic symmetry.

FIG. 3 shows grid Type C, obtained by joining the center of face to the four vertices of an underlying cube. It is composed of two types of vertices, one having cubic symmetry, and the other having the symmetry of the square prism.

FIG. 4 shows grid Type D, obtained by joining the mid-points of the faces with the mid-points of the edges and composed of one type of vertex having the symmetry of a square prism.

FIG. 5 shows grid Type E defined by the edges of the space-filling of rhombic dodecahedra and composed of two types of vertices, one with tetrahedral symmetry and the other with octahedral symmetry.

FIG. 6 shows grid Type F, a diamond lattice composed of one type of vertex having tetrahedral symmetry.

FIG. 7 shows grid Type G obtained by superimposing grids Types E and G, and composed of two types of vertices, one having tetrahedral symmetry and the other having cubic symmetry.

DETAILED DESCRIPTION OF THE INVENTION

The families of space labyrinths, space-fillings and space frames according to the invention are derived from seven underlying periodic space grids. The seven space grids are described first. This is followed by the description of the labyrinth-generation process. Nodal and connector polyhedra are described next, followed by the description of the labyrinths themselves. The space-fillings and space frames are described next and are derived from the labyrinths.

1. Seven Space Grids

The seven periodic space grids from which the labyrinths, space-fillings and space frames disclosed herein are known and are shown in FIGS. 1–7. These space grids have the following characteristics.

all seven are composed of one edge-length only,
the edges of all seven define even-sided polygons, and the symmetries of the vertices correspond to the symmetries of the tetrahedron, cube or a square prism.

Four are derived from the space-filling of regular cubes, and three are derived from the space-filling of rhombic dodecahedra; the rhombic dodecahedron is the dual of the well-known Archimedean polyhedron, the cuboctahedron. Four have one type of vertex, and three have two types of vertices.

Figure 1:
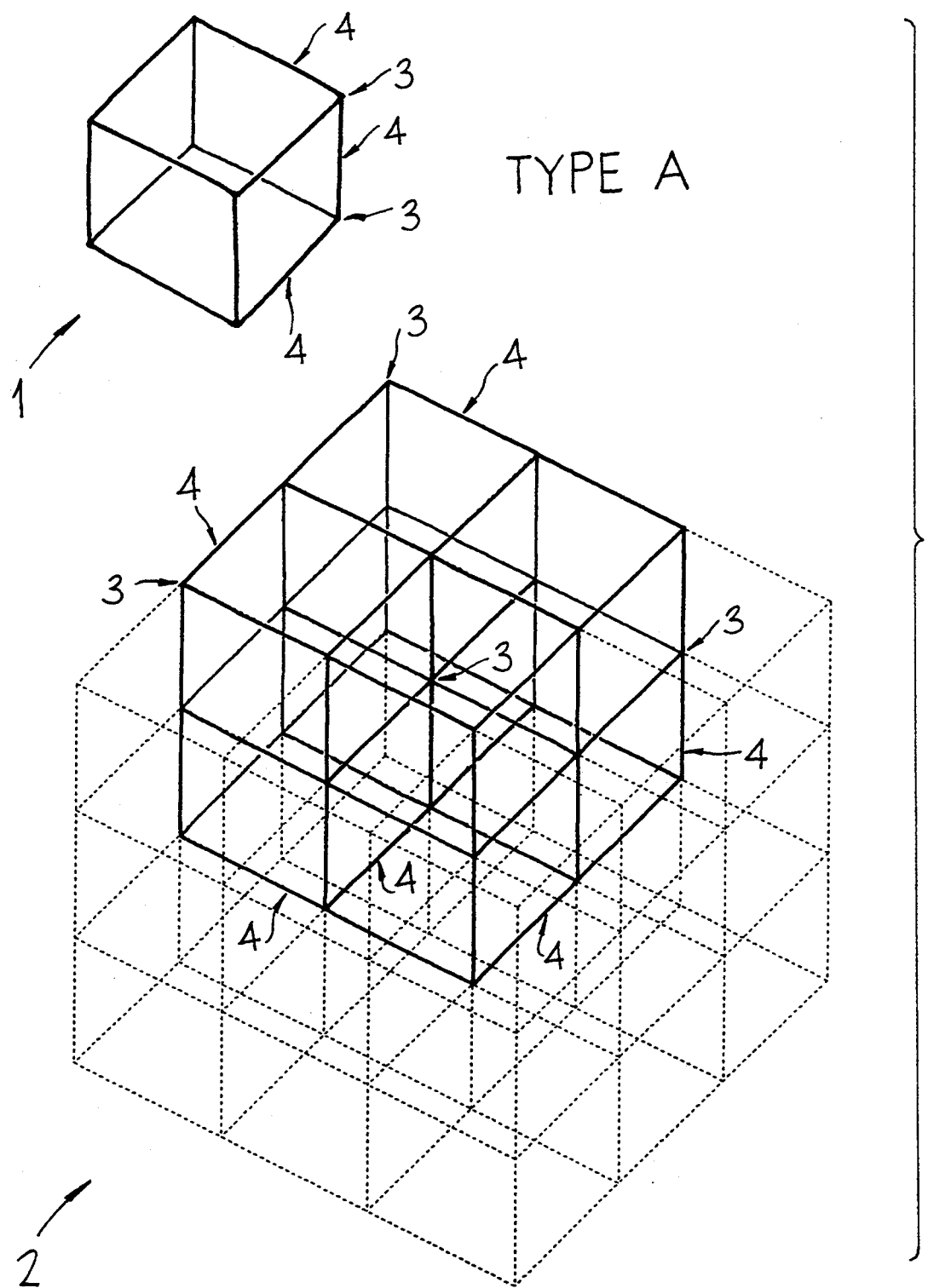

FIG. 1 shows grid Type A, the simple cubic lattice 2, composed of the cubic unit cell 1. Each node 3 of this lattice is identical and has cubic symmetry. Six edges 4 radiate from each vertex at 90°.

Figure 2:
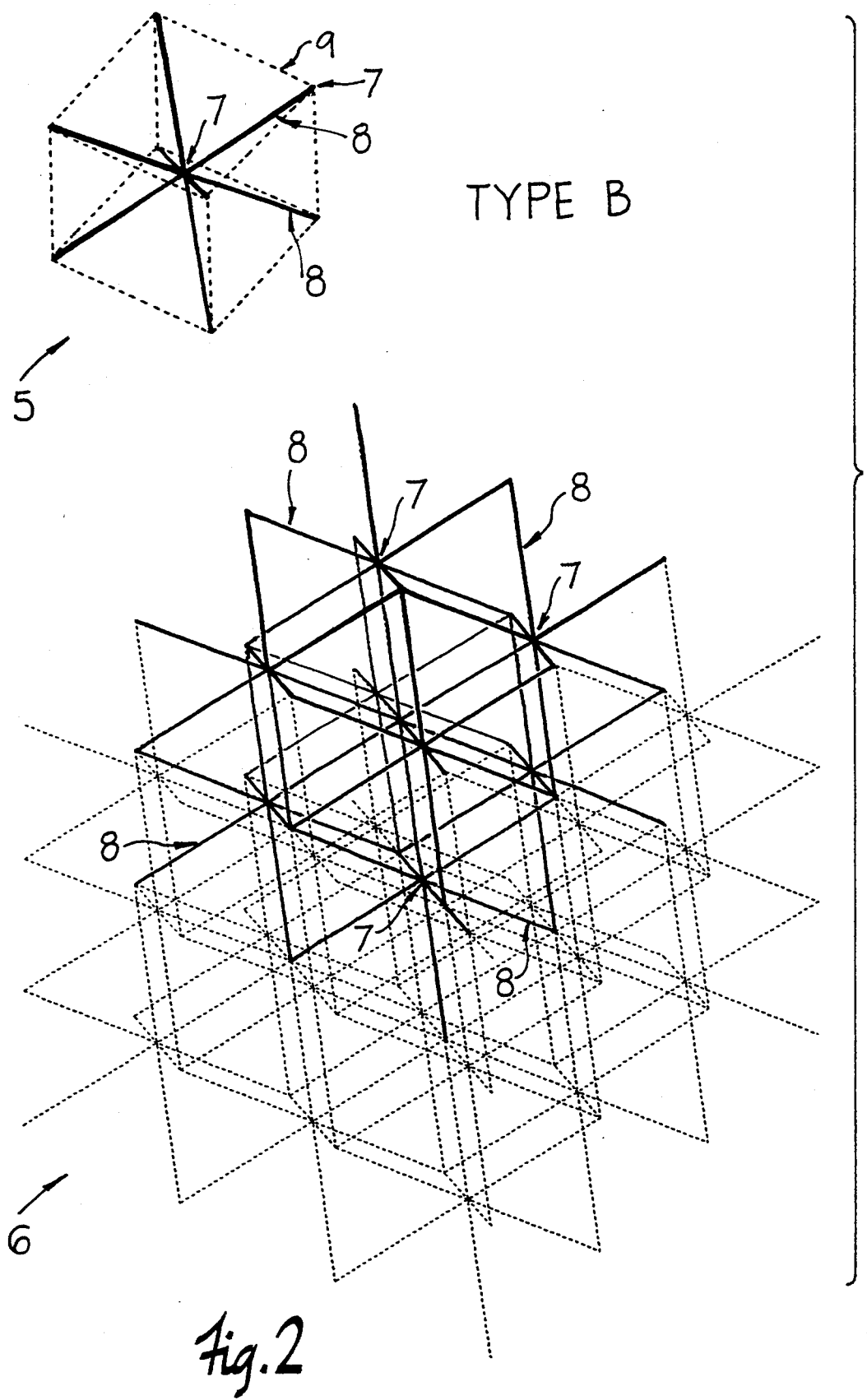

FIG. 2 shows the grid Type B, the body-centred cubic lattice 6 composed of the unit 5. Each node 7 is identical and has eight edges 8 radiating from a vertex located at the center of the cube 9 joining its eight corners.

Figure 3:
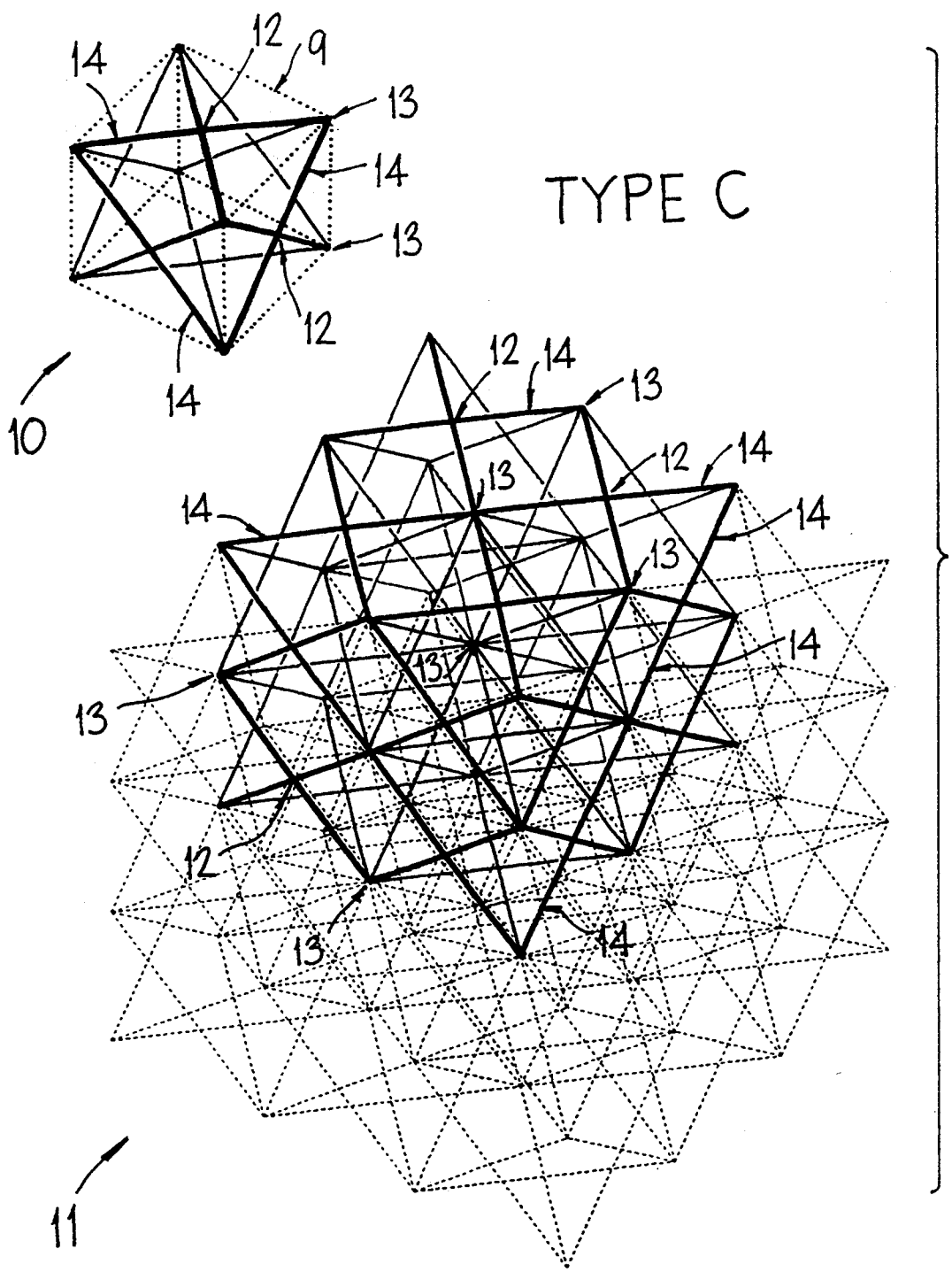

FIG. 3 shows grid Type C. The unit 10 is obtained by joining the center 12 of the faces of the cube 9 to the corners 13. Repeating this unit produces the grid 11. This grid has two types of vertices, vertices 13 with twelve edges 14 radiating from each, and vertices 12 with four edges 14 radiating from each vertex.

Figure 4:
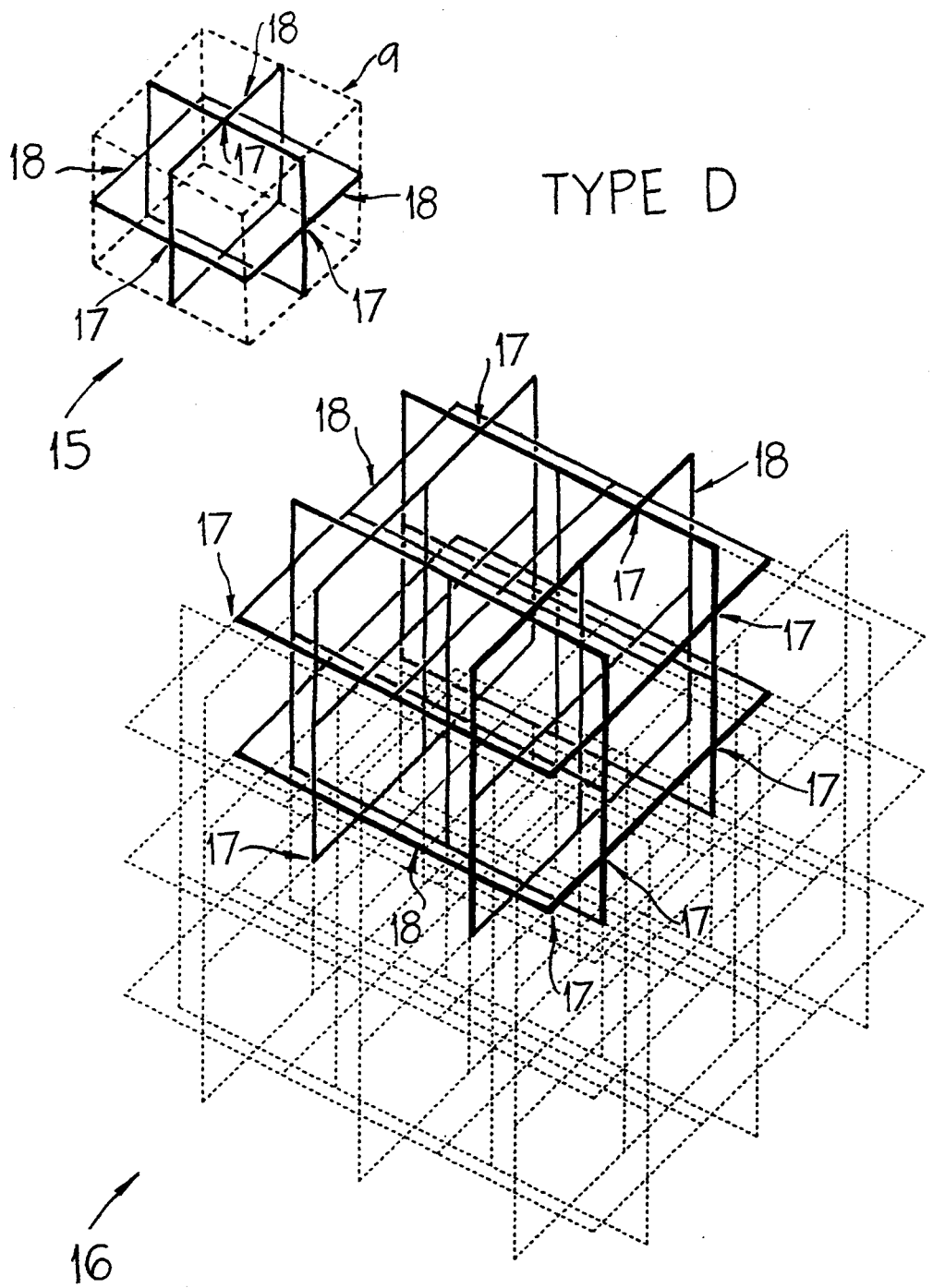

FIG. 4 shows grid Type D. The unit 15 is obtained by joining the mid-points 17 of the faces of the cube 9 to the mid-points of its edges. The unit is repeated to produce the grid 16. It has only one type of vertex 17 with four edges 18 radiating from it. The four edges 18 lie on one plane and are at right angles to one another, like a cross.

Figure 5:
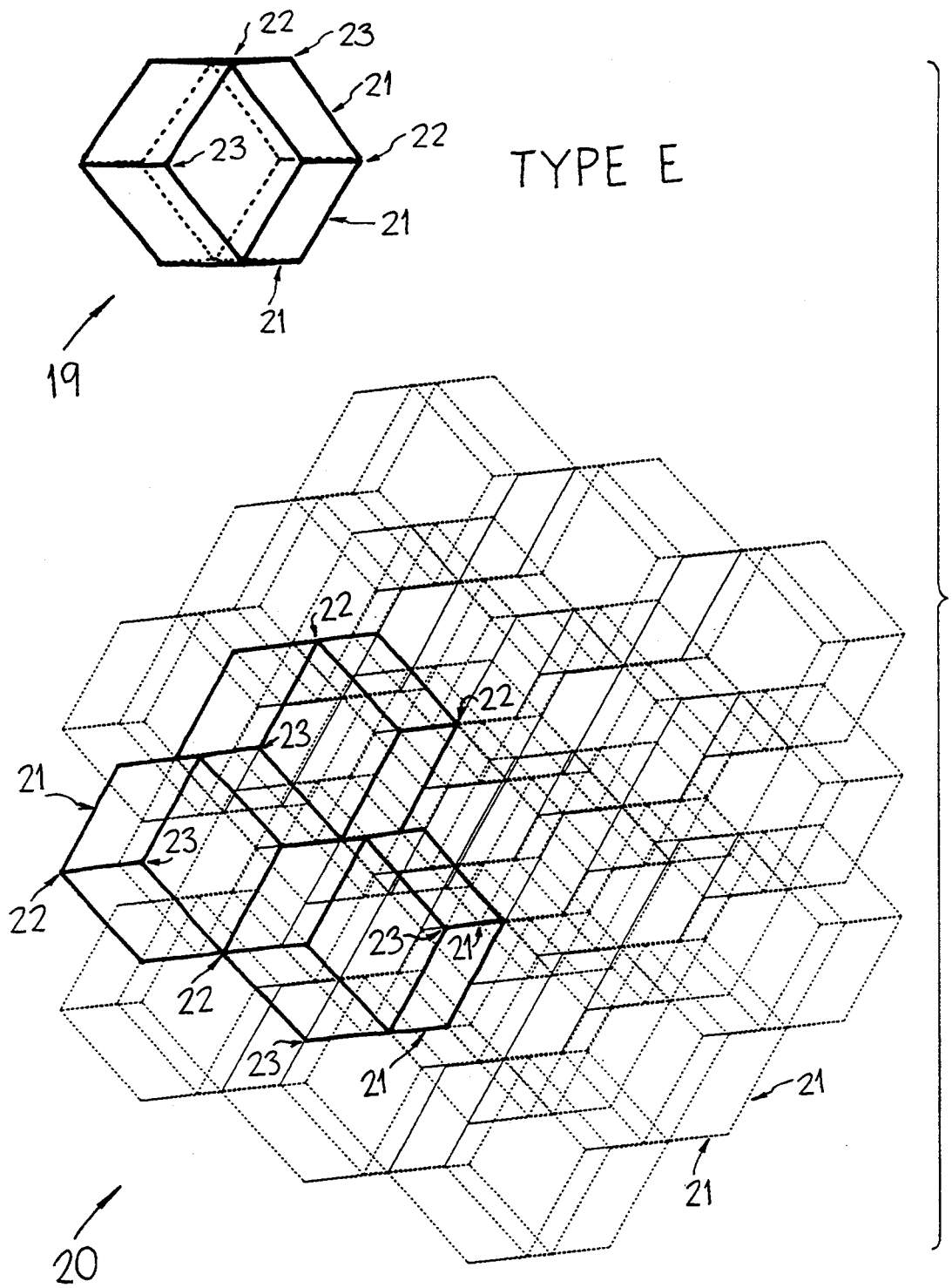

FIG. 5 shows grid Type E. The repeating unit 19 is the rhombic dodecahedron defined by the edges 21. The close-packing of rhombic dodecahedra produces the grid 20. It has two types of vertices, vertices 22 with eight edges 21 radiating from the vertex and having cubic symmetry (visualized by joining the center of a cube to its eight vertices), and vertices 23 having four edges 21 at a vertex in a tetrahedral symmetry (visualized by joining the center of a tetrahedron to its four vertices).

Figure 6:
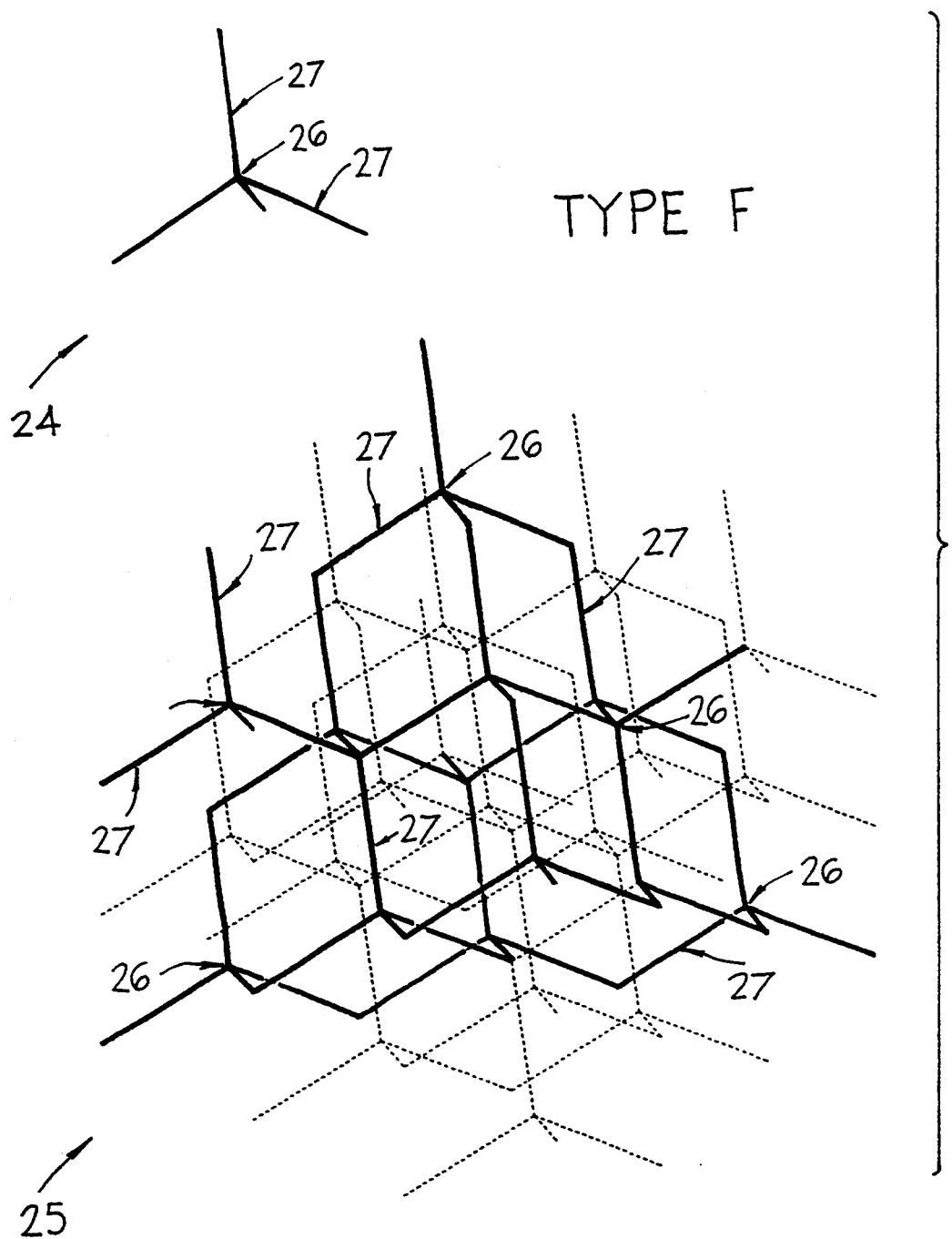

FIG. 6 shows the grid Type F, the diamond lattice 25 obtained by repeating the unit 24. It has one type of vertex 26, with each vertex having four edges 27 radiating from it in a tetrahedral symmetry and defined by the directions joining the center of a regular tetrahedron to its four vertices.

Figure 7:
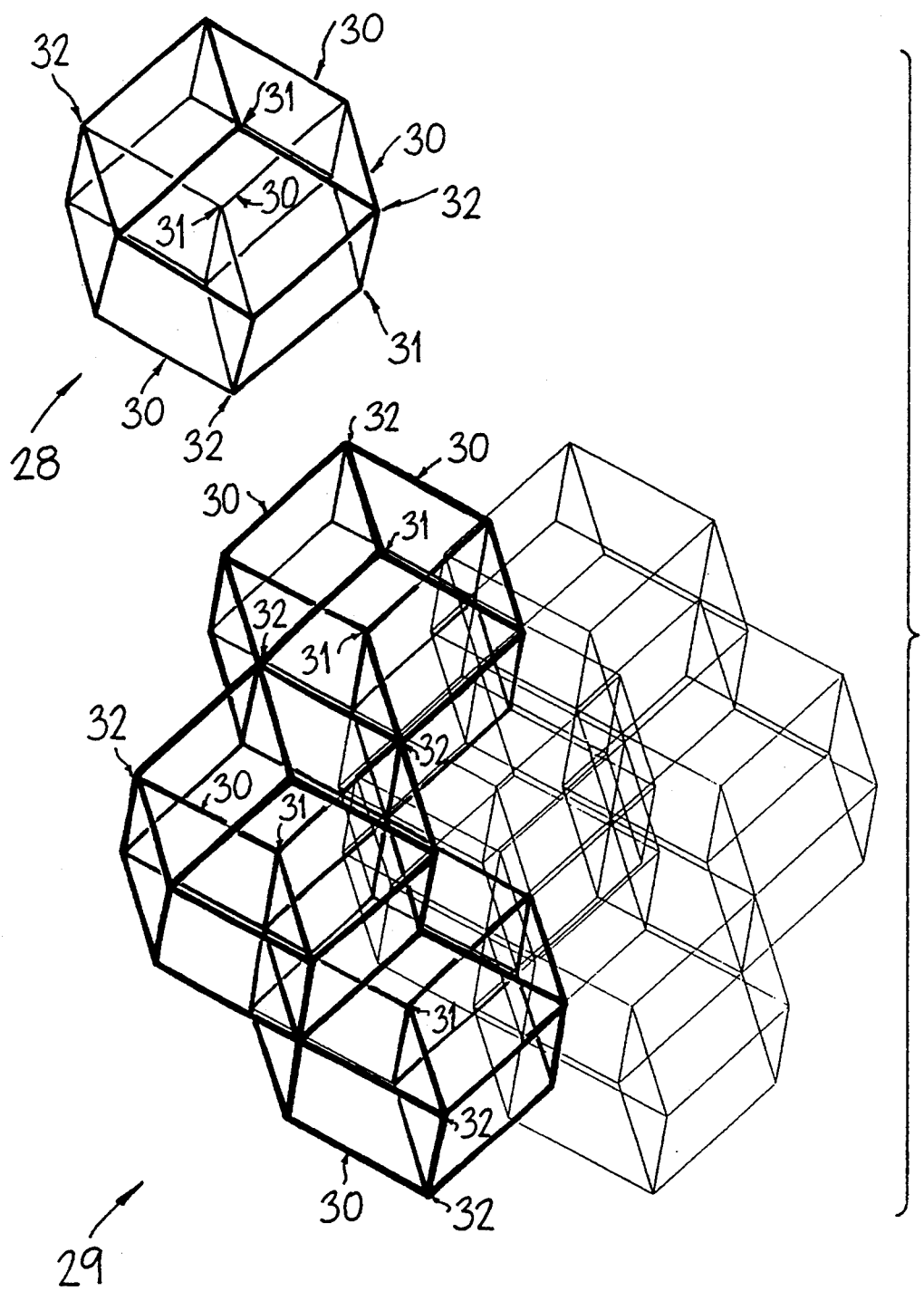

FIG. 7 shows the grid type G. The repeating unit is the rhombic dodecahedron which is subdivided into four Miraldi rhombohedra as shown in 28. Each Miraldi rhombohedron is composed of six rhombic faces with the obtuse face angle of 109°28+, also known as the Miraldi angle. It is defined by the edges 30, and its close-packing generates the grid 29. This grid has two types of vertices, vertices 31 with four edges radiating from a vertex in a tetrahedral symmetry and vertices 32 with eight edges radiating from a vertex in a cubic symmetry. The grid can be visualized by superimposing Type E grid (the diamond lattice) over type F grid (rhombic dodecahedral grid).

2. Labyrinth-Generation Process

The space labyrinths described herein are derived by the following five process steps:

a. Selecting one of the seven periodic space grid and identifying the symmetry of its vertices; this space grid will serve as the underlying grid for the labyrinth;

b. Selecting a pair of regular or semi-regular polyhedra corresponding to the vertices of the chosen grid, i.e. the polyhedra must have the same symmetry of subsymmetry of the vertex of the space grid, c. Placing selected pair of polyhedra on the alternating vertices of the chosen space grid; these polyhedra are here termed 'nodal polyhedra' and are placed in an orientation that matches the symmetry of the vertices of the grid;

d. Inter-connecting adjacent nodal polyhedra by connector pieces, here termed connector polyhedra, which correspond to the edges of the underlying grid;

e. Removing faces common to the nodal polyhedra and the connector polyhedra to produce a continuous space that links the interior of adjacent nodal spaces through the interior of the connector spaces.

The edges of the underlying space grid correspond to the axes of the connector polyhedra and define the connections between the centers of symmetry of the interior space of the labyrinth. The connections between the centers of symmetry of the exterior space defines a complimentary space grid, and the surface of the labyrinth separates the pair of complementary grids.

3. Nodal Polyhedra

The nodal polyhedra for the seven grids correspond to three symmetries, namely 432 (cubic or octahedral), 332 (tetrahedral) and 422 (square prismatic). The polyhedra corresponding to each symmetry are listed below and identified by an alphabetic symbol.

| Symmetry | Cubic Symmetry | |
|---|---|---|
| | Square Prismatic | Tetrahedral |
| O-Octahedron | T-Tetrahedron | SP-Square Prism |
| C-Cube | T'-Dual Tetrahedron | SP'-Square Prism |
| CO-Cuboctaheoron | O'-Octahedron | OP-Octagonal Prism |
| TC-Truncated Cube | TT-Truncated Tetrahedron | |
| TO-Truncated Octahedron | TT'-Truncated Tetrahedron | |
| RC-Rhombicuboctahedron | CO'-Cuboctahedron | |
| TCO-Trunc, Cuboctahedron | TO'-Truncated Octaheoron | |
| SC-Snub Cube | ST-Snub Tetrahedron | |

The polyhedra listed above are well-known and comprise three regular or Platonic polyhedra, eight semi-regular or Archimedean polyhedra, and two regular prisms. The regular polyhedra are composed one type of regular polygon meeting alike at every vertex, and semi-regular polyhedra are composed of two or more types of regular polygons meeting alike at every vertex. This disclosure, however, is not restricted to regular faces. Polyhedra with non-regular faces are permissible as long as the symmetry and topology of the polyhedra are maintained. For example, the hexagons of the truncated octahedra TO need not have regular hexagons. Instead, symmetric hexagons with two edge-lengths alternating will preserve the 3-fold symmetry. Similarly, the octagon of the truncated cube TC could have two different lengths, a short one and a long one alternating. The square faces of the truncated cuboctahedron TCO could be rectangles instead of squares.

The cubic and tetrahedral symmetries each have eight polyhedra and the square prism family has three prisms which are useful for constructing labyrinths. The cubic symmetry is characterized by the symmetry of the cube, namely the rotational axes of 4-fold, 3-fold and 2-fold radiating from the center of the cube and joining its mid-faces, vertices and mid-edges. Similarly, the tetrahedral symmetry is characterized by the symmetry of the tetrahedron, namely the rotational axes of 3-fold, another 3-fold, and a 2-fold radiating from the center to the mid-faces, vertices and mid-edges of a tetrahedron. The symmetry of the square prism is characterized by the 4-fold axis of rotation joining the mid-points of "top" and "bottom" horizontal faces to the center, and two different 2-fold axes joining the mid-points of the vertical edges and the mid-points of the upright faces to the center.

The cubic family has all distinct polyhedra, but the tetrahedral family has several topological duplicates. The tetrahedron T and the dual tetrahedron T' are identical, but T' is turned at 90° with respect to T. The two truncated tetrahedra TT and TT' are similarly oriented at 90° to one another. The cuboctahedron CO' in the tetrahedral family is different from the cuboctahedron CO in the cubic family in that the eight triangular faces of CO' comprise two alternating sets of four faces, with one set corresponding to T and the other to T'. Similarly, the truncated octahedron CO' has two sets of four hexagonal faces, with one set corresponding to the four hexagonal faces of TT, and the other to TT'. The snub tetrahedron is the familiar icosahedron. The square prism SP' is rotated at 45° with respect to the square prism SP.

When used as nodal polyhedra of space labyrinths, the polyhedra listed above have selected faces removed. The removed faces are perpendicular to the axes of symmetry of the polyhedra and are also perpendicular to the edges or axes of the underlying space grids. Thus the removed faces and the space grids have a dual relationship with one another. The various polyhedra with removed faces and their notation are listed below:

Cubic Symmetry-nodal Polyhedra with Faces Removed

The alphabetic notation from the above table is modified with a suffix which indicates the types of faces removed. The suffix 1 indicates faces perpendicular to the 4-fold axes are removed, suffix 2 indicates faces perpendicular to the 3-fold axes are removed, and suffix 3 indicates faces perpendicular to the 2-fold axes are removed. The complete list includes:

O2—Octahedron with 3 triangular faces removed
C1—Cube with 6 square faces removed
CO1—Cuboctahedron with 6 square faces removed
CO2—Cuboctahedron with 8 triangular faces removed
TC1—Truncated Cube with 6 octagonal faces removed
TC2—Truncated Cube with 8 triangular faces removed
TO1—Truncated Octahedron with 6 square faces removed
TO2—Truncated Octahedron with 8 hexagonal faces removed
RC1—Rhombicuboctahedron with 6 square faces removed
RC2—Rhombicuboctahedron with 8 triangular faces removed
RC3—Rhombicuboctahedron with 12 square faces removed
TCO1—Truncated Cuboctahedron with 6 octagonal faces removed
TCO2—Truncated Cuboctahedron with 8 hexagonal faces removed
TCO3—Truncated Cuboctahedron with 12 square faces removed
SC1—Snub Cube with 6 square faces removed
SC2—Snub Cube with 8 triangular faces removed
SC3—Snub Cube with 24 triangular faces (at 2-fold axes) removed Tetrahedral Symmetry-nodal Polyhedra with Faces Removed Here the suffices are used as follows: suffix 1 indicates faces perpendicular to the 3-fold axes are removed, suffix 2 indicates faces perpendicular to the second set of 3-fold axes are removed, and suffix 3 indicates faces perpendicular to the 2-fold axes are removed. The complete list includes:

T1—Tetrahedron with 4 triangular faces removed
T'2—Dual Tetrahedron with 4 triangular faces removed
O'1—Octahedron with 4 triangular faces removed
O'2—Octahedron with alternate 4 triangular faces removed
TT1—Truncated Tetrahedron with 4 triangular faces removed
TT2—Truncated Tetrahedron with 4 hexagonal faces removed
TT'1—Truncated Tetrahedron with 4 hexagonal faces removed
TT'2—Truncated Tetrahedron with 4 triangular faces removed
CO'1—Cuboctahedron with 4 triangular faces removed
CO'2—Cuboctahedron with alternate 4 triangular faces removed
CO'3—Cuboctahedron with 6 square faces removed
TO'1—Truncated Octahedron with 4 hexagonal faces removed
TO'2—Truncated Octahedron with alternate 4 hexagonal faces removed
TO'3—Truncated Octahedron with 6 square faces removed
ST1—Snub Tetrahedron with 4 triangular faces removed
ST2—Snub Tetrahedron with alternate 4 triangular faces removed
ST3—Snub Tetrahedron with 12 triangular faces (at 2-fold axes) removed Square Prismatic-nodal Polyhedra with Faces Removed The suffix 1 indicates the faces perpendicular to the 4-fold axis of symmetry of the square prism are removed, and suffix 2 indicates the faces perpendicular to the 2-fold axes are removed. The list includes:

SP1—Square Prism with 2 square faces removed
SP2—Square Prism with 4 square faces removed
SP'1—Square Prism with 2 square faces removed
SP'2—Square Prism with 4 square faces removed
OP1—Octagonal Prism with 2 octagonal faces removed
OP2—Octagonal Prism with 4 square faces removed 4. Connector Polyhedra The connector polyhedra comprise the following:
polygonal prisms of any height,
polygonal anti-prisms of any height,
half-cuboctahedra of any height,
pyramids of any height,
skewed anti-prisms having rotational symmetry, and
skewed half-cuboctahedra having rotational symmetry.

The symmetry of the connectors matches the symmetry of the removed faces of the nodal polyhedra. For example, a 3-sided prism connects the triangular faces of two polyhedra along the 3-fold axis, a 4-sided anti-prism connects the square faces of two polyhedra along the 4-fold axis, and so on.

5. Generating Other Spatial Configurations

A slight change in the five process steps described above for generating labyrinths can lead to other space structures. For example, eliminating the fifth step of removing faces leads to spatial configurations which are also composed of two nodal polyhedra and thus two types of vertices. When the "empty space within these configurations are filled in with other convex or non-convex polyhedra, space-fillings are obtained. When the connectors are elongated into long thin members keeping the nodal polyhedra unchanged, space frame configurations with nodes and struts are obtained. These are also derivative configurations from the basic process described.

In the section below, space labyrinths with "hollow nodes and "hollow" connectors, and spatial configurations with closed or solid nodes and connectors are shown alongside. The latter can easily be converted into space frames by elongating the struts and designing suitable coupling devices between the nodes and struts. Alternatively, the empty spaces can be filled in to generate space-fillings which can be used as a starting basis for designing architectural environments.

6. Examples of Space Labyrinths and Related Configurations

This section describes the various labyrinths and related space structures derived from each space grid. These are obtained by considering all combinations of pairs of nodal polyhedra from those described above. Many of these require connectors like pyramids, half-cuboctahedra and other less regular shapes. The configurations described below are restricted to those having connectors which are prisms or anti-prisms. Fifty-one such configurations are described and illustrated.

6.1 Configurations from Grid Type A

Figure 8A:
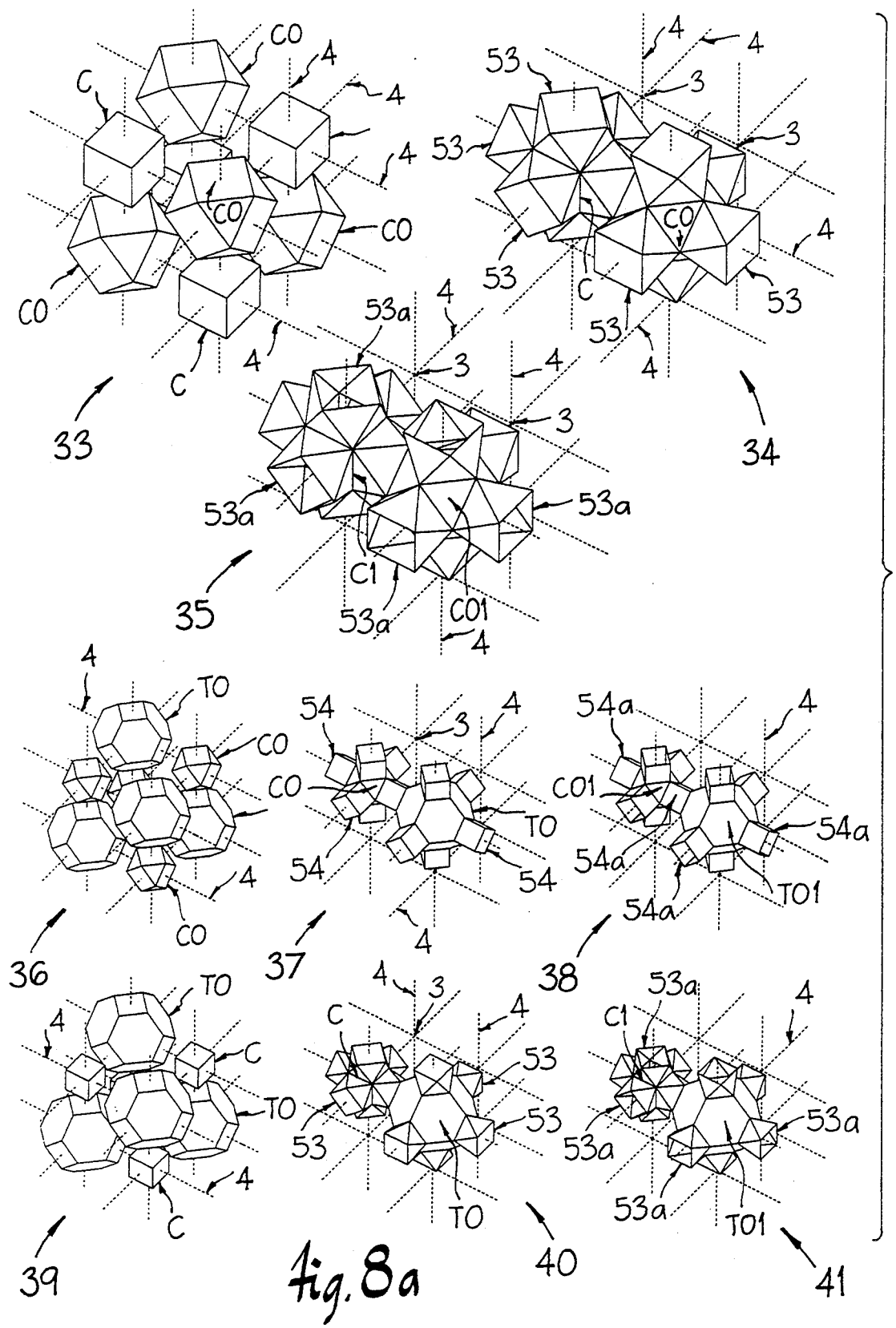
FIGS. 8a and 8b show seven configurations and labyrinths based on grid Type A and obtained by pairing the polyhedra of cubic symmetry.
Figure 8B:
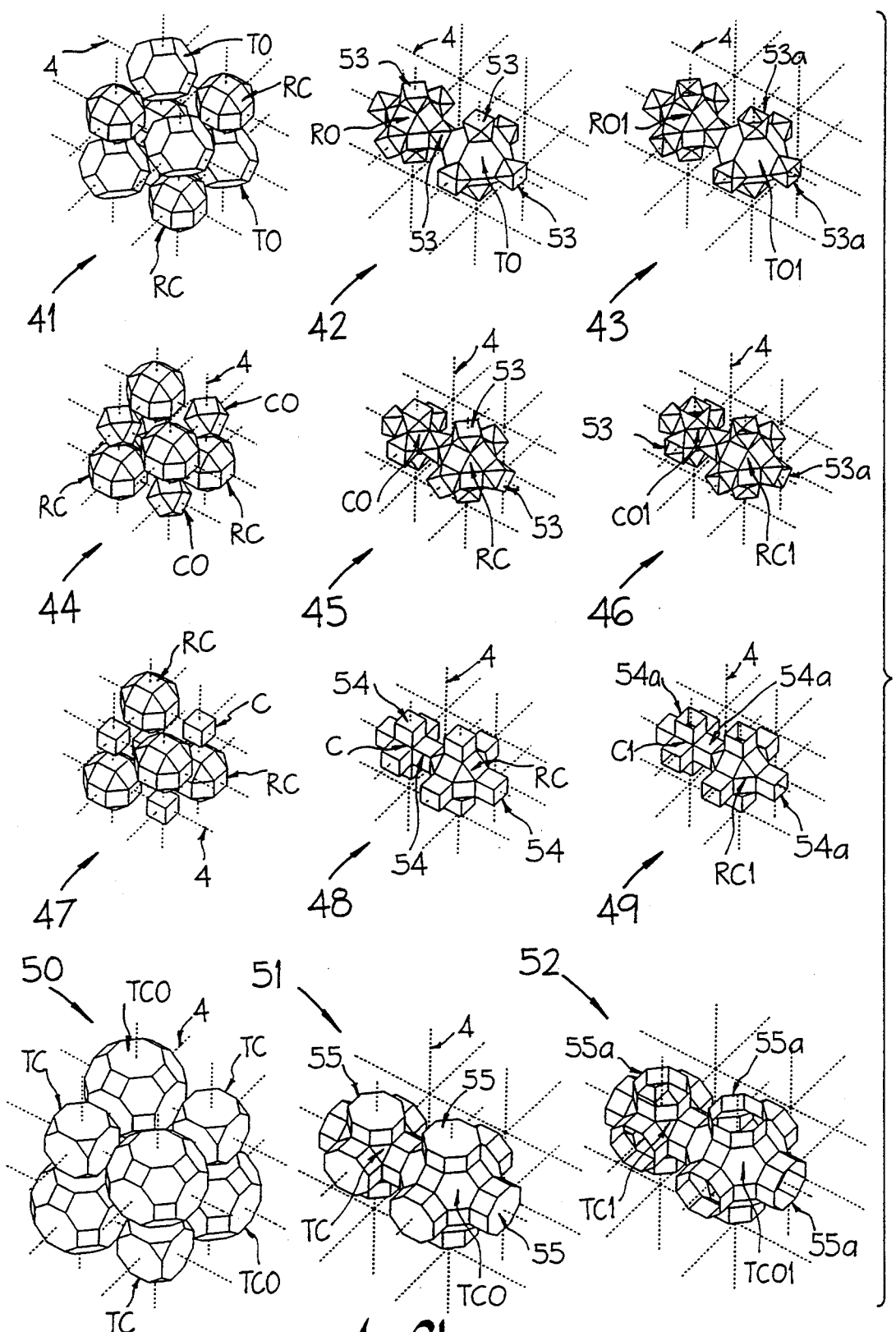

The space labyrinths and related configurations with two nodal polyhedra based on grid Type A, the cubic grid 2, comprise twenty-eight distinct combinations of pairs obtained from the eight nodal polyhedra listed above. These pairs are placed alternatingly on the vertices of an underlying cubic grid and interconnected with connectors. The nodal polyhedra have cubic symmetry in all cases. From these seven examples are shown. For each, the nodal polyhedral spaces and the connector shapes (restricted to prisms and anti-prisms) are specified and shown in FIGS. 8a and 8b. In the labyrinths, the removed faces correspond go the 4-fold axes.

1. The combination with cubes C and cuboctahedra CO as shown in illustration 33. In 34, two adjacent nodal polyhedra are inter-connected by square anti-prisms 53. In 35, the square faces common to the connectors and the nodal polyhedra are removed to generate a portion of a space labyrinth. The nodal spaces correspond to C1 and CO1, and the connectors 53a have their square faces open.

2. The combination with cuboctahedra CO and truncated octahedra TO as shown in 36. In 37, the modal polyhedra are inter-connected by square prisms 54. In the labyrinth 38, the square faces of the nodal polyhedra and the square prisms are removed. The nodal spaces comprise CO1 and TO1 and the connector is 54a.

3. The combination with cubes C and truncated octahedra TO as shown in 39. The nodal polyhedra are inter-connected by square anti-prisms 53. The derivative labyrinth uses nodal spaces C1 and TO1 and connectors 53a.

4. The combination with rhombicuboctahedra RC and truncated octahedra TO as shown in 41. In 42, the nodal polyhedra are inter-connected by square anti-prisms 53. The related labyrinth has square faces removed and comprises RC1 and TO1 as the nodal spaces, and 53a as the hollow connector space.

5. The combination with cuboctahedra CO and rhombicuboctahedra RC as shown in 44. The nodal polyhedra are inter-connected by square anti-prisms 53 in 45. The related labyrinth is composed of RC1 and CO1, connected by 53a.

6. The combination with cubes C and rhombicuboctahedra RC as shown in 47. The nodal polyehdra are connected by square prisms 54 in 48. The labyrinth 49 is composed of nodal spaces RC1 and C1 connected by the open-ended prism 54a.

7. The combination with truncated cubes TC and truncated cuboctahedra TC as shown in 50. The nodal polyhedra are inter-connected by octagonal prisms 55 in 51. The labyrinth 52 is composed of nodal spaces TC1 and TCO1 connected by open-ended octagonal prisms 55a.

6.2 Configurations from Grid Type B

Figure 9A:
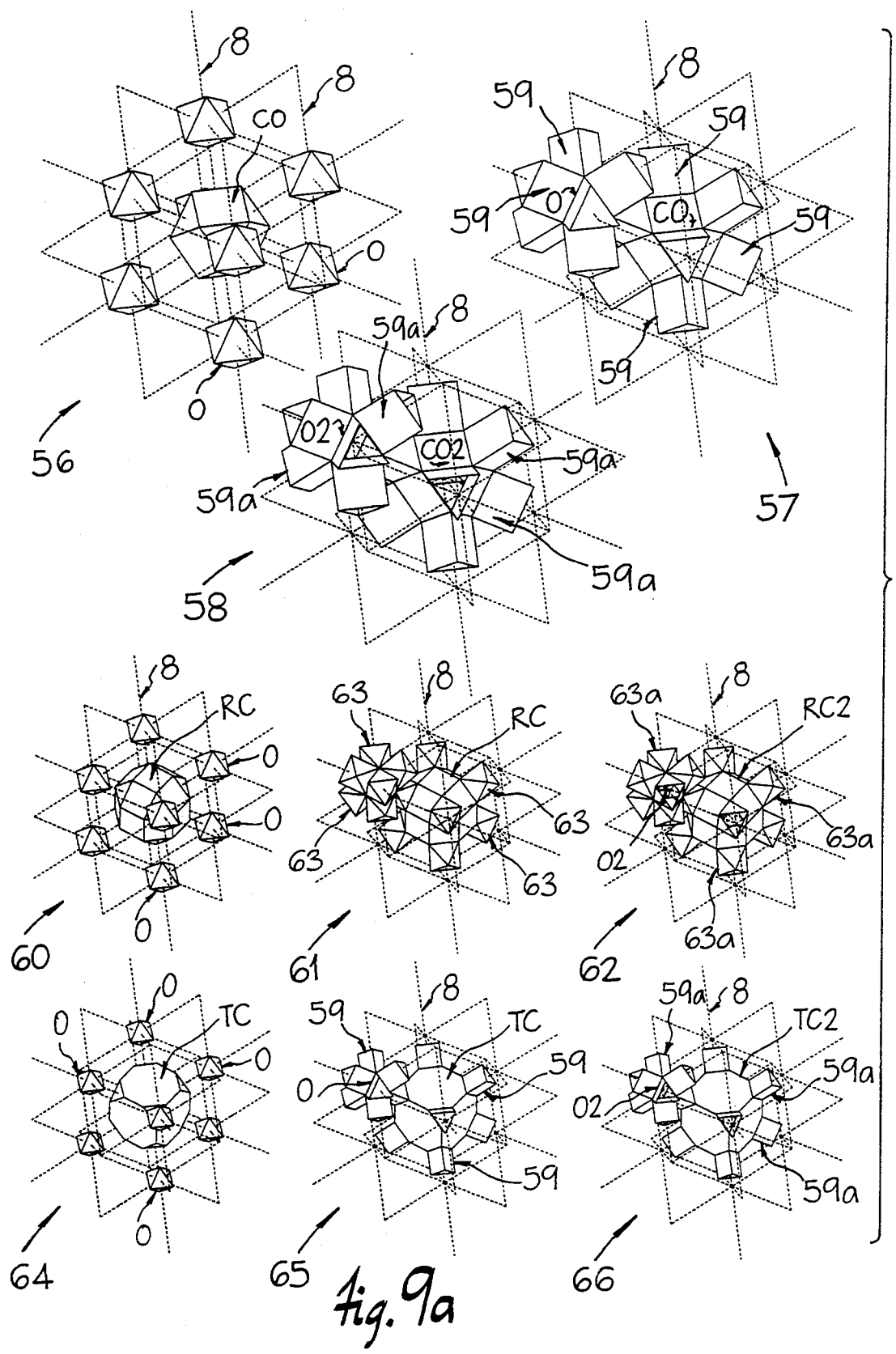
FIGS. 9a and 9b show seven configurations and labyrinths based on grid Type B, also obtained by pairing the polyhedra of cubic symmetry.
Figure 9B:
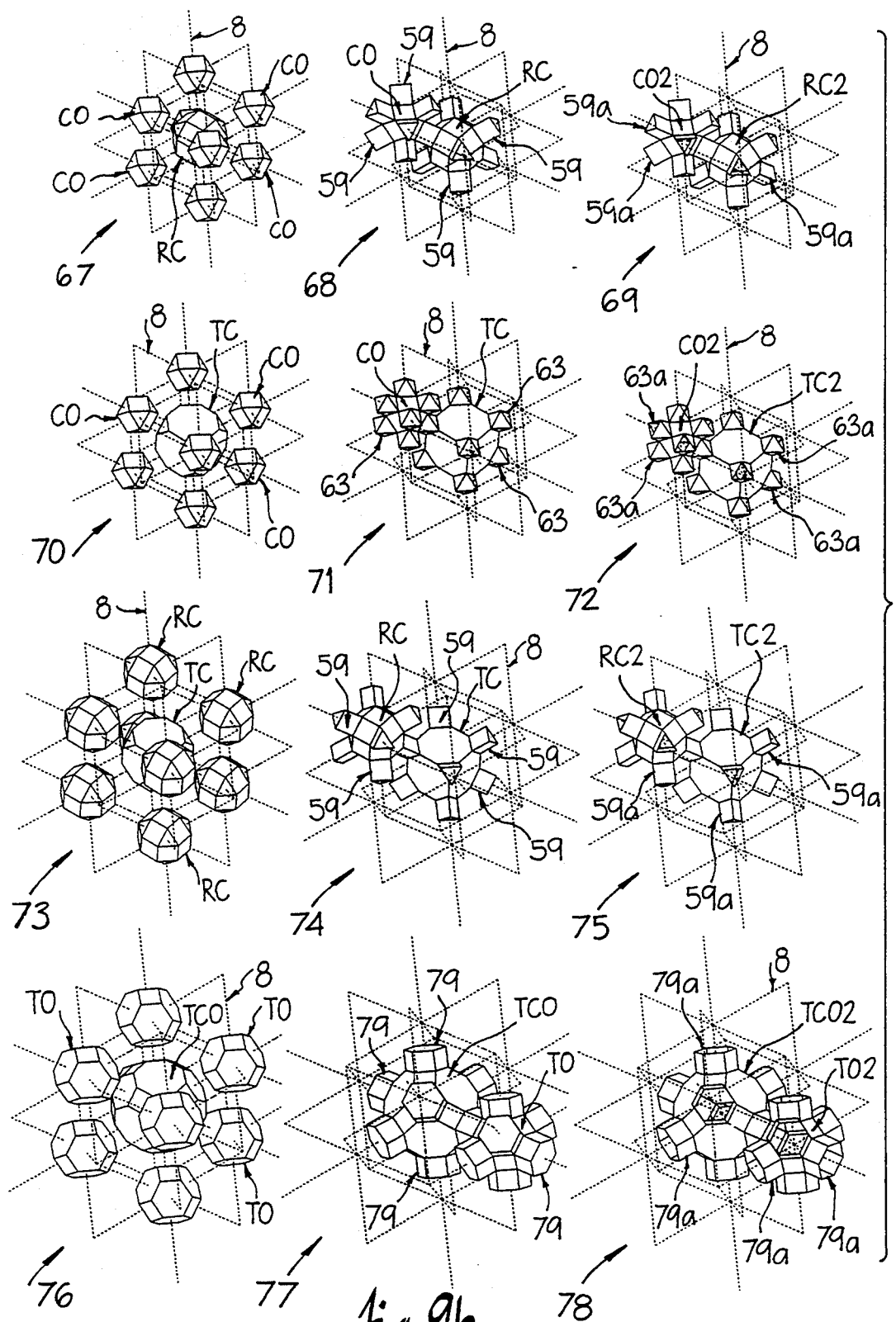

Space labyrinths and configurations based on the body-centered cubic grid Type B and composed of two nodal polyhedra comprise twenty-eight distinct combinations, as in the last family. Of these seven have prismatic and anti-prismatic connectors and are shown in FIGS. 9a and 9b. The nodal polyhedra are selected from the eight regular-faces polyhedra of cubic symmetry and are placed alternatingly on the grid Type B. In the labyrinths, the removed faces correspond to the 3-fold axes.

8. The configuration 56 with octahedra O and cuboctahedra CO as nodal polyhedra. These are connected by regular triangular prisms 59 in the configuration 57. The associated labyrinth 58 has triangular faces removed and is composed of O2 and CO2 as nodal spaces connected by open prisms 59a.

9. The configuration 60 with octahedra O and rhombicuboctahedra RC as nodal polyhedra. In configuration 61, these are connected by triangular anti-prisms 63. The labyrinth 62 comprises O2 and RC2 with triangle faces removed connected by the open-ended anti-prism 63a.

10. The configuration 64 with octahedra O and truncated cube TC as nodal polyhedra, connected by regular triangular prisms 59 in 65. The related labyrinth 66 has triangular faces removed and is composed of O2 and TC2 as nodal spaces linked by 59a.

11. The configuration 67 with cuboctahedra CO and rhombicuboctahedra RC as nodal polyhedra, connected by triangular prisms 59 in 68. The related labyrinth 69 has triangular faces removed and is composed of nodal spaces CO2 and RC2 connected by 59a.

12. The configuration 70 with cuboctahedra CO and truncated cube TC as nodal polyhedra, connected by regular triangular anti-prisms 63 in 71. The related labyrinth 72 has triangular faces removed and is composed of nodal spaces CO2 and TC2 connected by 63a.

13. The configuration 73 with rhombicuboctahedra RC and truncated cube TC as nodal polyhedra, connected by triangular prisms 59 in 74. The related labyrinth 75 has triangular faces removed and is composed of spaces RC2 and TC2 linked by 59a.

14. The configuration 76 with truncated octahedra TO and truncated cuboctahedra TCO as nodal polyhedra, connected by regular hexagonal prisms 79 in 77. The related labyrinth 78 has hexagonal faces removed and is composed of nodal spaces TO2 and TCO2 connected by open-ended hexagonal prisms 79a.

6.3 Configurations from Grid Type C

Figure 10:
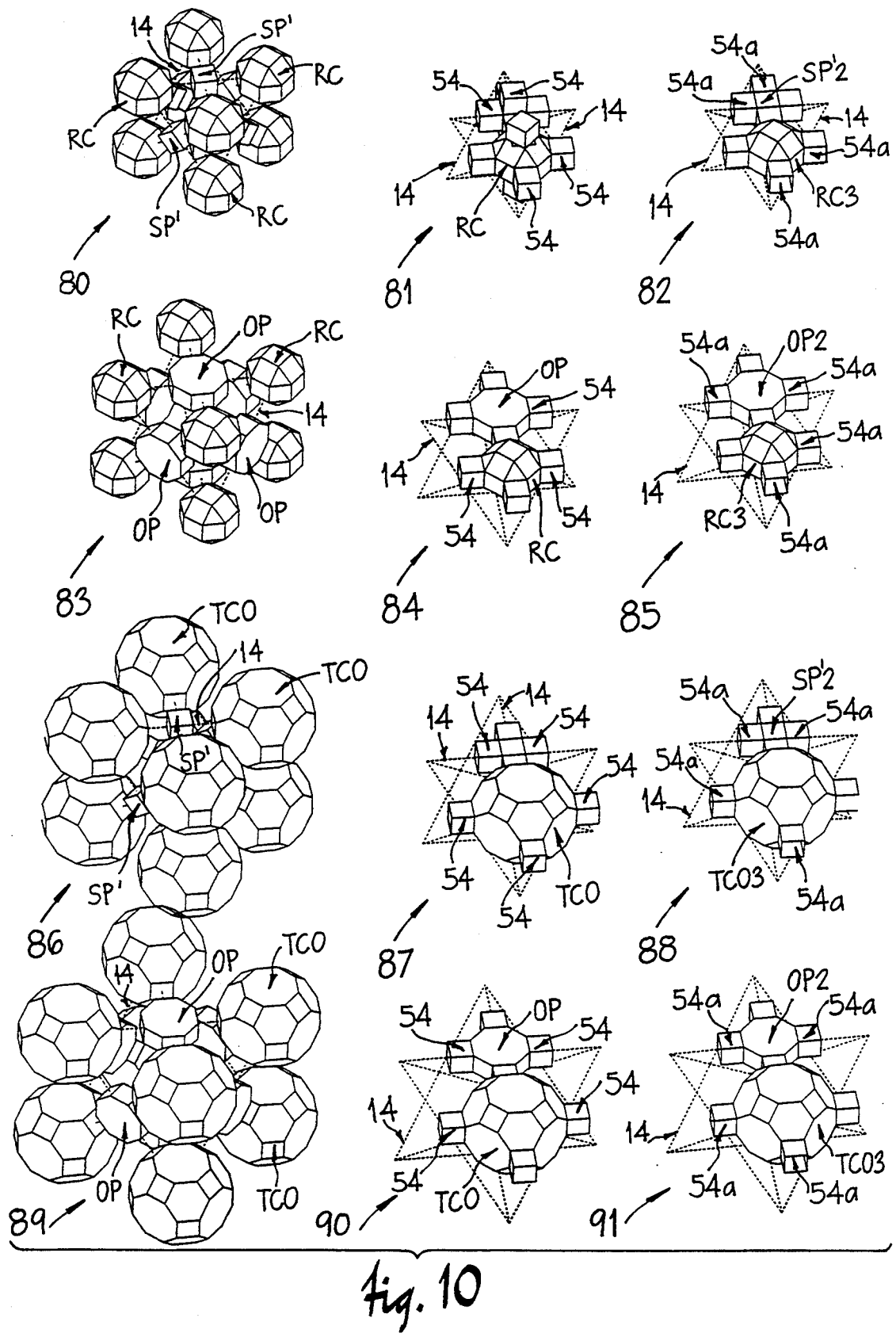
FIG. 10 shows four configurations and labyrinths based on grid Type C and obtained by pairing the polyhedra having symmetry of the cube and the square prism.

FIG. 10 shows four sets of configurations based on grid Type C. The nodal polyhedra are selected from cubic symmetry and square prism family. As before, three illustrations are shown for each, the first showing the combination of the polyhedral pair, the second showing the nodal polyhedra interconnected, and the third a portion if a labyrinth. The illustrations are restricted to configurations with prismatic connectors. In the labyrinths, the 2-fold faces are removed.

15. The combination of nodal polyhedra RC and SP' in 80, connected by square prisms 54 in 81. The labyrinth 82 is composed of RC3 with twelve square faces removed and SP'2 with four square faces removed, and connected with the open-ended square prism 54a.

16. The combination of nodal polyhedra RC and OP in 83, connected by square prisms 54 in 84. The labyrinth 84 is also composed of RC3 with twelve square faces removed and OP2 with four square faces removed, and connected with the open-ended square prism 54a.

17. The combination of nodal polyhedra TCO and SP' in 86, connected by square prisms 54 in 87. The labyrinth 88 is composed of TCO3 with twelve square faces removed and SP'2 with four square faces removed, and connected with the open-ended square prism 54a.

18. The combination of nodal polyhedra TCO and OP in 89, connected by square prisms 54 in 90. The labyrinth 91 is composed of TCO3 with twelve square faces removed and OP2 with four square faces removed, and connected with the open-ended square prism 54a.

6.4 Configurations from Grid Type D

Figure 11:
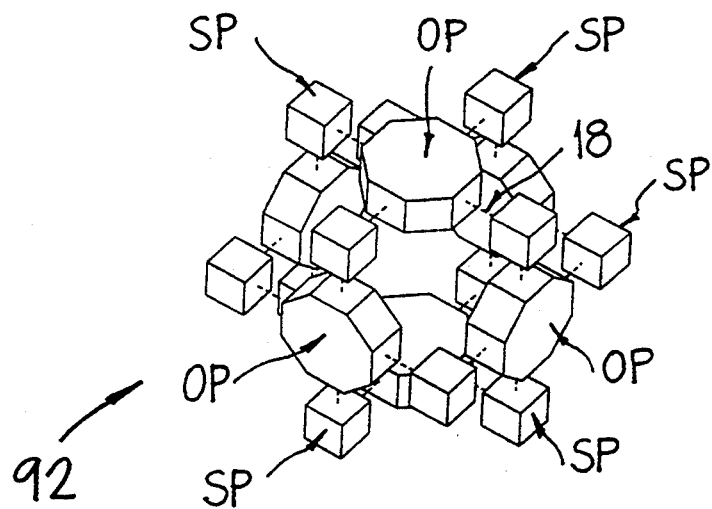
FIG. 11 shows one configuration and labyrinth based on grid Type D and obtained by pairing the polyhedra having the symmetry of a square prism.
Figure 11:
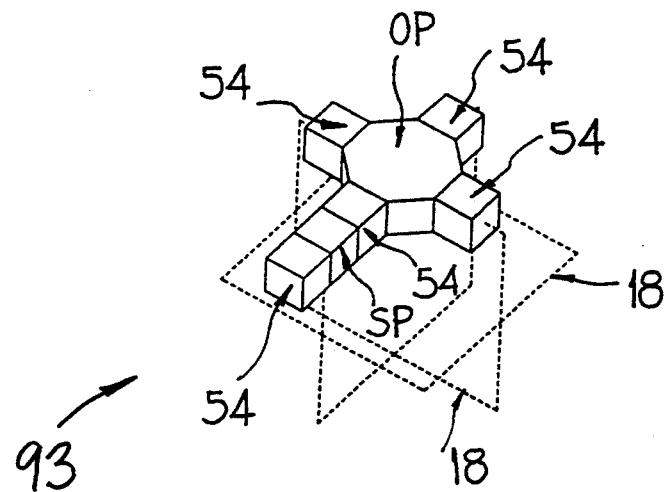
Figure 11:
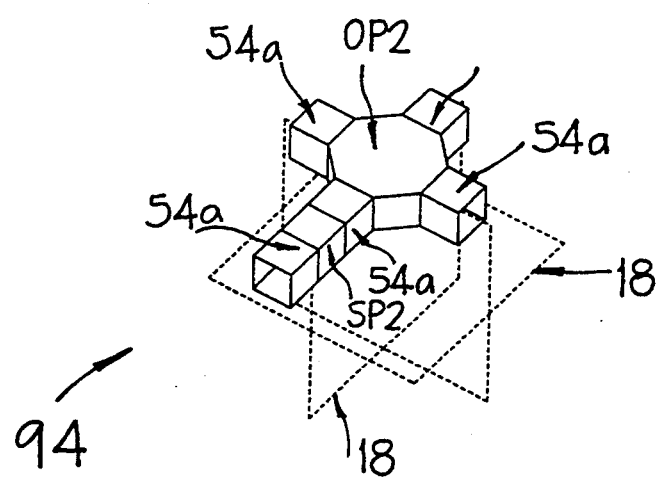
Figure 12A:
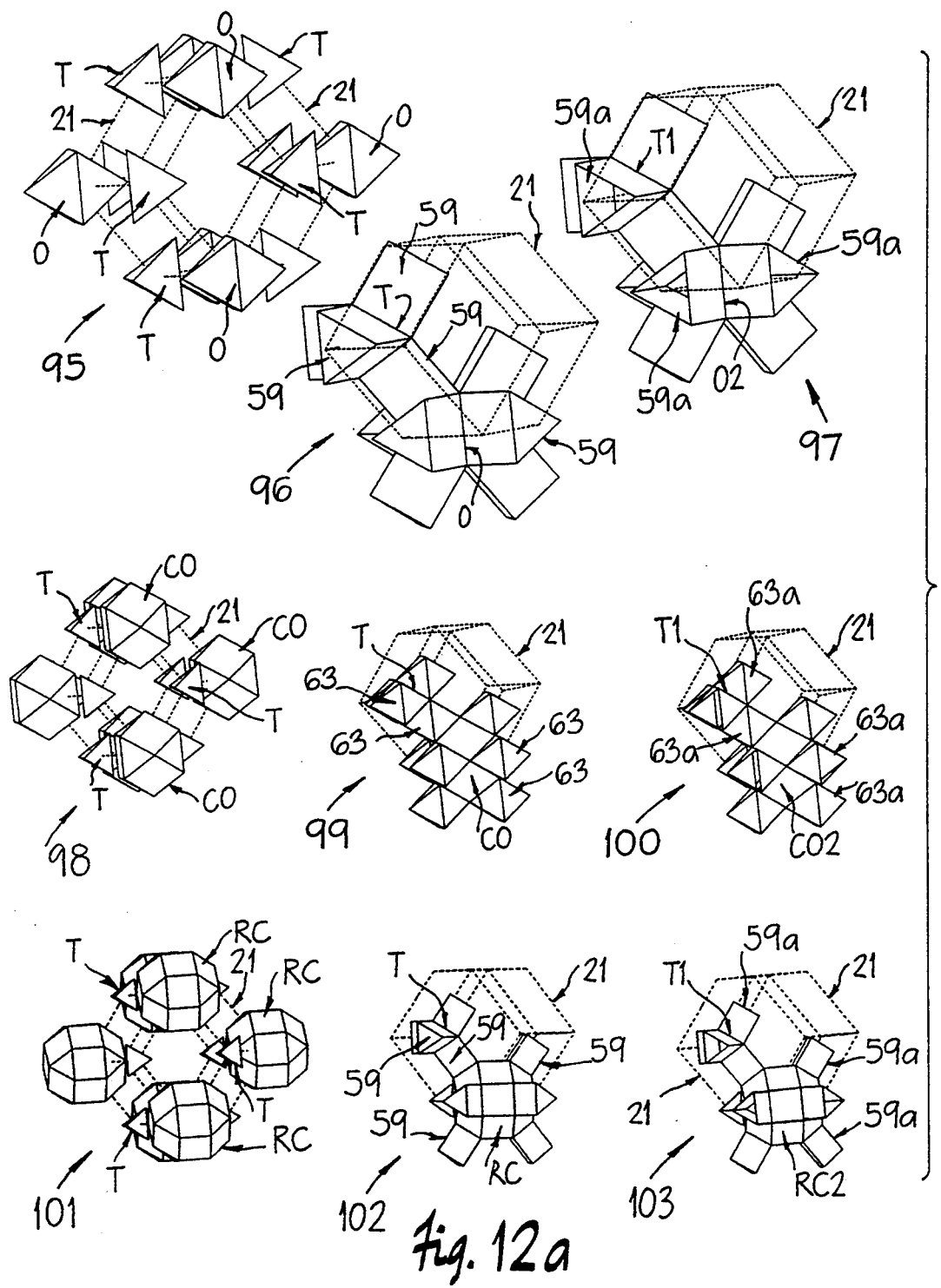
FIGS. 12a, 12b, 12c and 12d show twenty configurations and labyrinths based on grid Type E and obtained by pairing the polyhedra of tetrahedral and cubic symmetries.
Figure 12B:
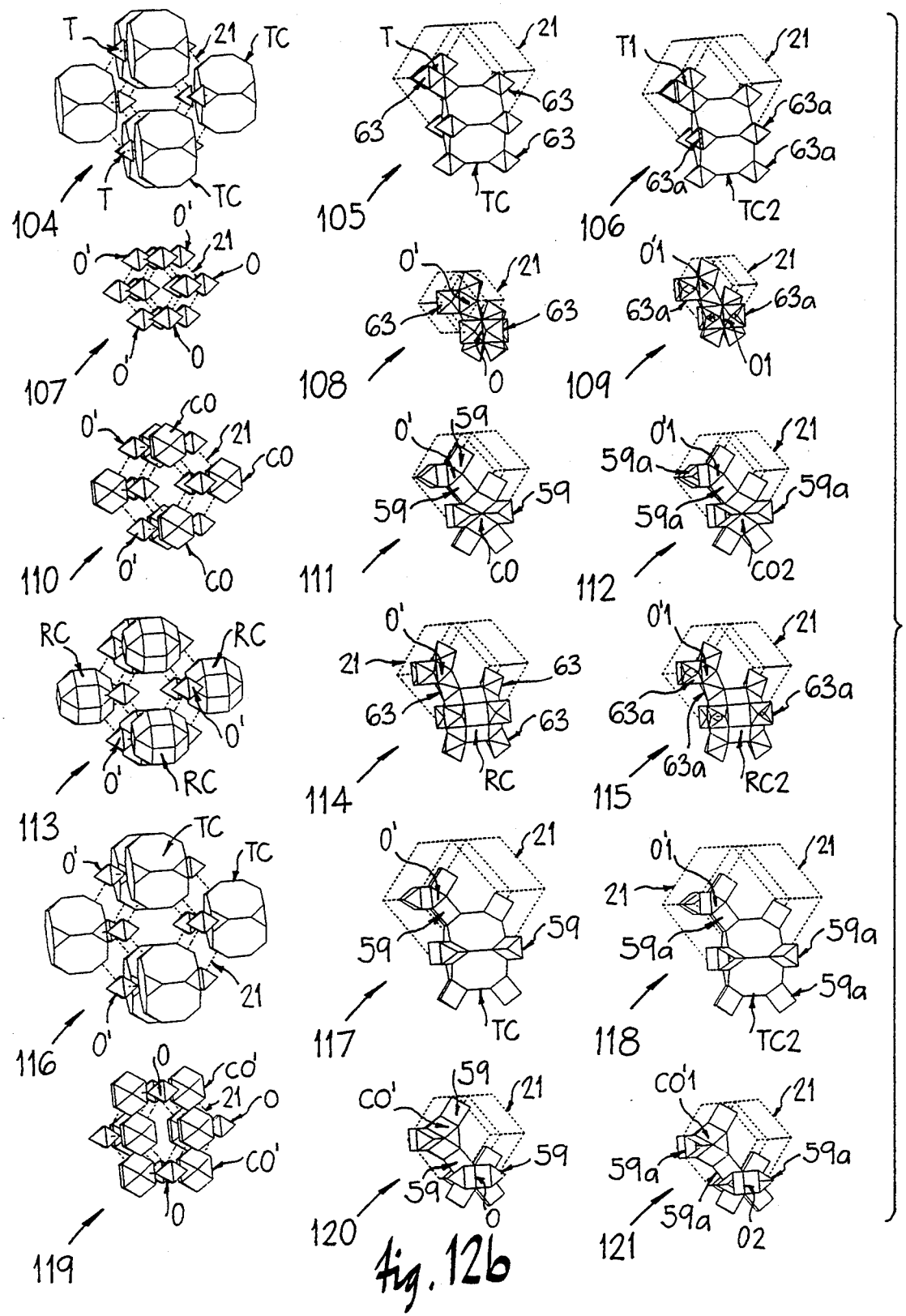
Figure 12C:
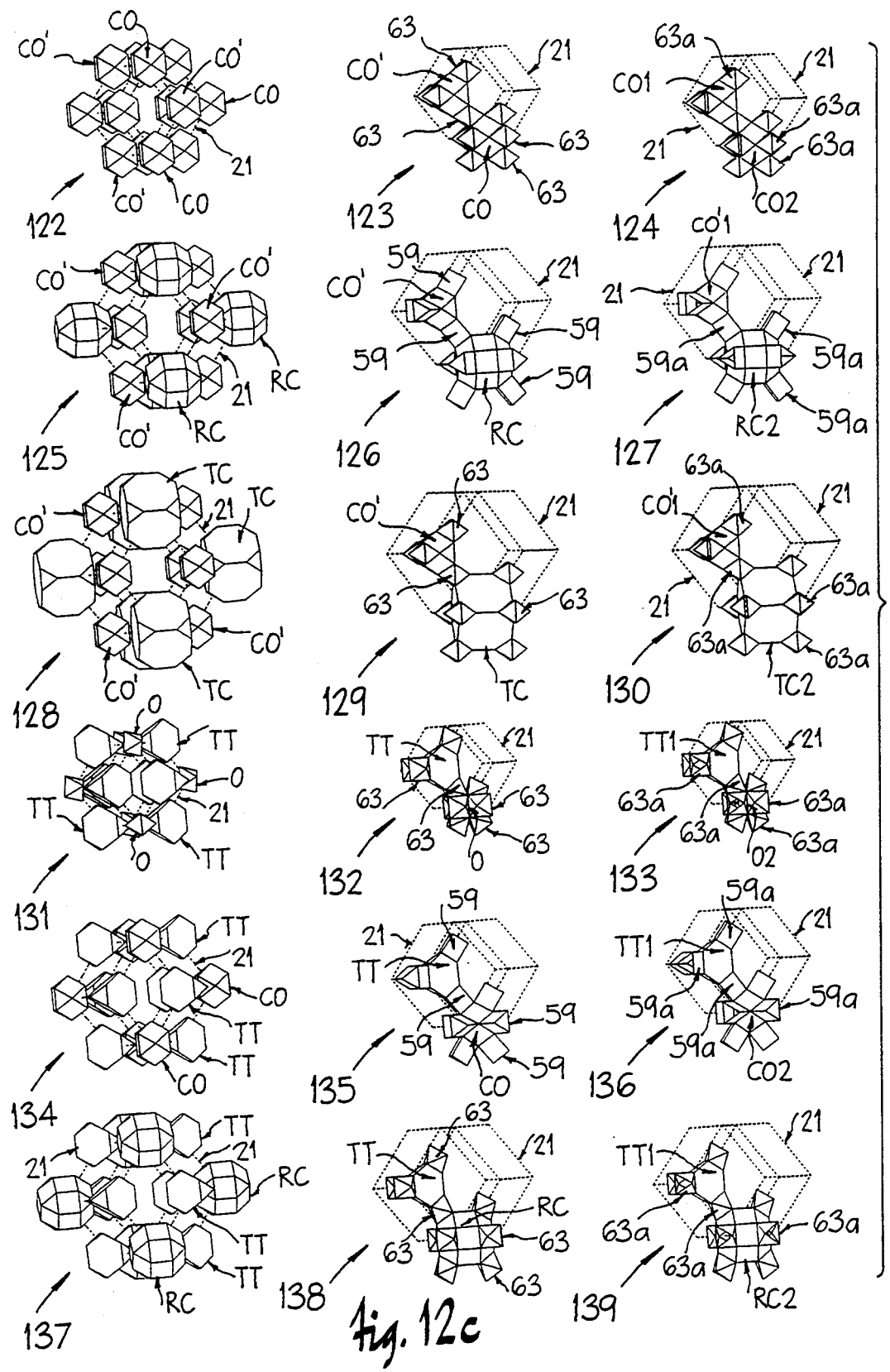
Figure 12D:
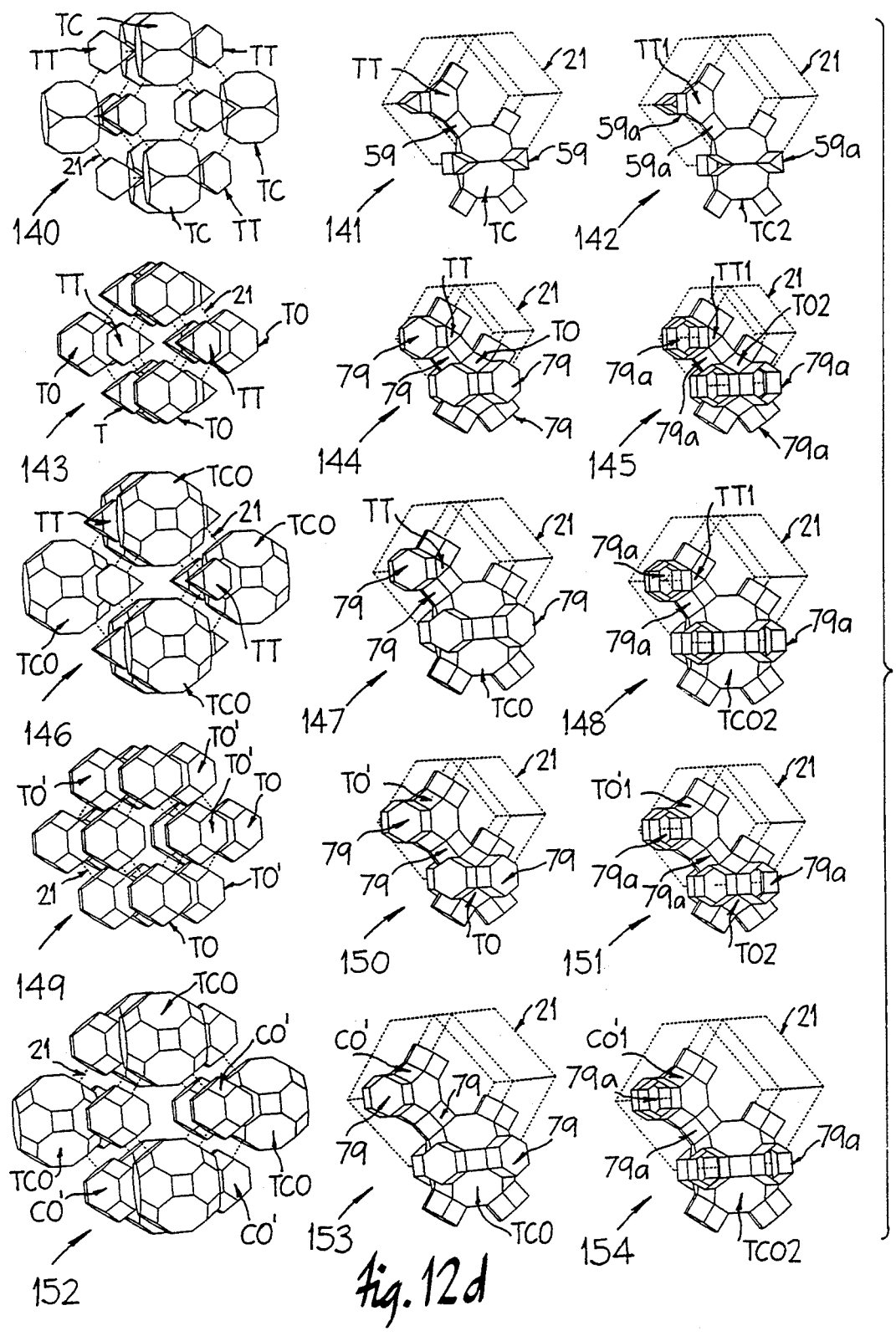

One set of configurations based on grid Type D is shown in FIG. 11. The polyhedra are restricted to the square prism family and interconnected with square prisms.

19. The illustration 92 shows the combination of OP and SP as nodal polyhedra. These are interconnected by square prisms 54 in 93. The related labyrinth 94 is composed of octagonal prism OP2 with four square faces removed and square prism SP2 also with four square faces removed and inter-connected by square prisms 54a.

6.5 Configurations from Grid Type E

FIGS. 12a–d shows configurations and labyrinths based on grid Type E. The configurations combine polyhedra from the tetrahedral and cubic families. Twenty combinations of nodal polyhedra and derived configurations and labyrinths are illustrated. Additional configurations are possible form these two sets, leading to a total of 64 combinations. The labyrinths have 3-fold faces removed.

20. (FIG. 12a) The combination of tetrahedron T and octahedron O as nodal polyhedra as shown in 95, and interconnected with triangular prisms 59 in 96. The related labyrinth 97 has triangular faces removed and are composed of T1 and O2, interconnected by open triangular prisms 59a.

21. The combination 98 comprises the pair tetrahedron T and cuboctahedron CO. Two neighboring nodal polyhedra are inter-connected with triangular anti-prisms 63 in 99. The related labyrinth 100 has triangular faces removed and is composed of T1 and CO2, inter-connected by open triangular anti-prisms 63a.

22. The combination 101 comprising the pair tetrahedron T and rhombicuboctahedron RC. In the configuration 102, two neighbouring nodal polyhedra are inter-connected with triangular prisms 59. The related labyrinth 103 has triangular faces removed and is composed of T1 and RC2, interconnected by open triangular anti-prisms 59a.

23. (FIG. 12b) The combination T-TC in 104, interconnected by triangular anti-prisms 63 in 105. The labyrinth 106, composed of T1 and TC2 connected with triangular anti-prisms 63a, each with triangular faces removed.

24. The combination O'-O in 107, interconnected by triangular anti-prisms 63 in 108. The labyrinth 109, composed of O'1 and O2 connected with triangular anti-prisms 63a, each with triangular faces removed.

25. The combination O'-CO in 110, interconnected by triangular prisms 59 in 111. The labyrinth 112, composed of O'1 and CO2 connected with triangular prisms 59a, each with triangular faces removed.

26. The combination O'-RC in 113, interconnected by triangular anti-prisms 63 in 114. The labyrinth 115, composed of O'1 and RC2 connected with triangular anti-prisms 63a, each with triangular faces removed.

27. The combination O'-TC in 116, interconnected by triangular prisms 59 in 117. The labyrinth 118, composed of O'1 and TC2 connected with triangular prisms 59a, each with triangular faces removed.

28. The combination CO'-O in 119, interconnected by triangular prisms 59 in 120. The labyrinth 121, composed of CO'1 and O2 connected with triangular prisms 59a, each with triangular faces removed.

29. (FIG. 12c) The combination CO'-CO in 122, interconnected by triangular anti-prisms 63 in 123. The labyrinth 124, composed of CO'1 and CO2 connected with triangular anti-prisms 63a, each with triangular faces removed.

30. The combination CO'-RC in 125, interconnected by triangular prisms 59 in 126. The labyrinth 127, composed of CO'1 and RC2 connected with triangular prisms 59a, each with triangular faces removed.

31. The combination CO'-TC in 128, interconnected by triangular prisms 59 in 129. The labyrinth 130, composed of CO'1 and TC2 connected with triangular prisms 59a, each with triangular races removed.

32. The combination TT-O in 131, interconnected by triangular anti-prisms 63 in 132. The labyrinth 132, composed of TT1 and O2 connected with triangular anti-prisms 63a, each with triangular faces removed.

33. The combination TT-CO in 134, interconnected by triangular prisms 59 in 135. The labyrinth 136, composed of TT1 and CO2 connected with triangular prisms 59a, each with triangular faces removed.

34. The combination TT-RC in 137, interconnected by triangular anti-prisms 63 in 138. The labyrinth 139, composed of TT1 and RC2 connected with triangular anti-prisms 63a, each with triangular faces removed.

35. The combination TT-TC in 140, interconnected by triangular prisms 59 in 141. The labyrinth 142, composed of TT1 and TC2 connected with triangular prisms 59a, each with triangular faces removed.

36. The combination TT-TO in 143, interconnected by hexagonal prisms 79 in 144. The labyrinth 145, composed of TT1 and TO2 connected with hexagonal prisms 79a, each with hexagonal faces removed.

37. The combination TT-TCO in 146, interconnected by hexagonal prisms 79 in 147. The labyrinth 148, composed of TT1 and TCO2 connected with hexagonal prisms 79, each with hexagonal faces removed.

38. The combination TO'-TCO in 149, interconnected by hexagonal prisms 79 in 150. The labyrinth 151, composed of TO'1 and TO2 connected with hexagonal prisms 79, each with hexagonal faces removed.

39. The combination TO'-TCO in 152, interconnected by hexagonal prisms 79 in 153. The labyrinth 154, composed of TO'1 and TCO2 connected with hexagonal prisms 79, each with hexagonal faces removed.

6.6 Configurations from Grid Type G

Figure 13A:
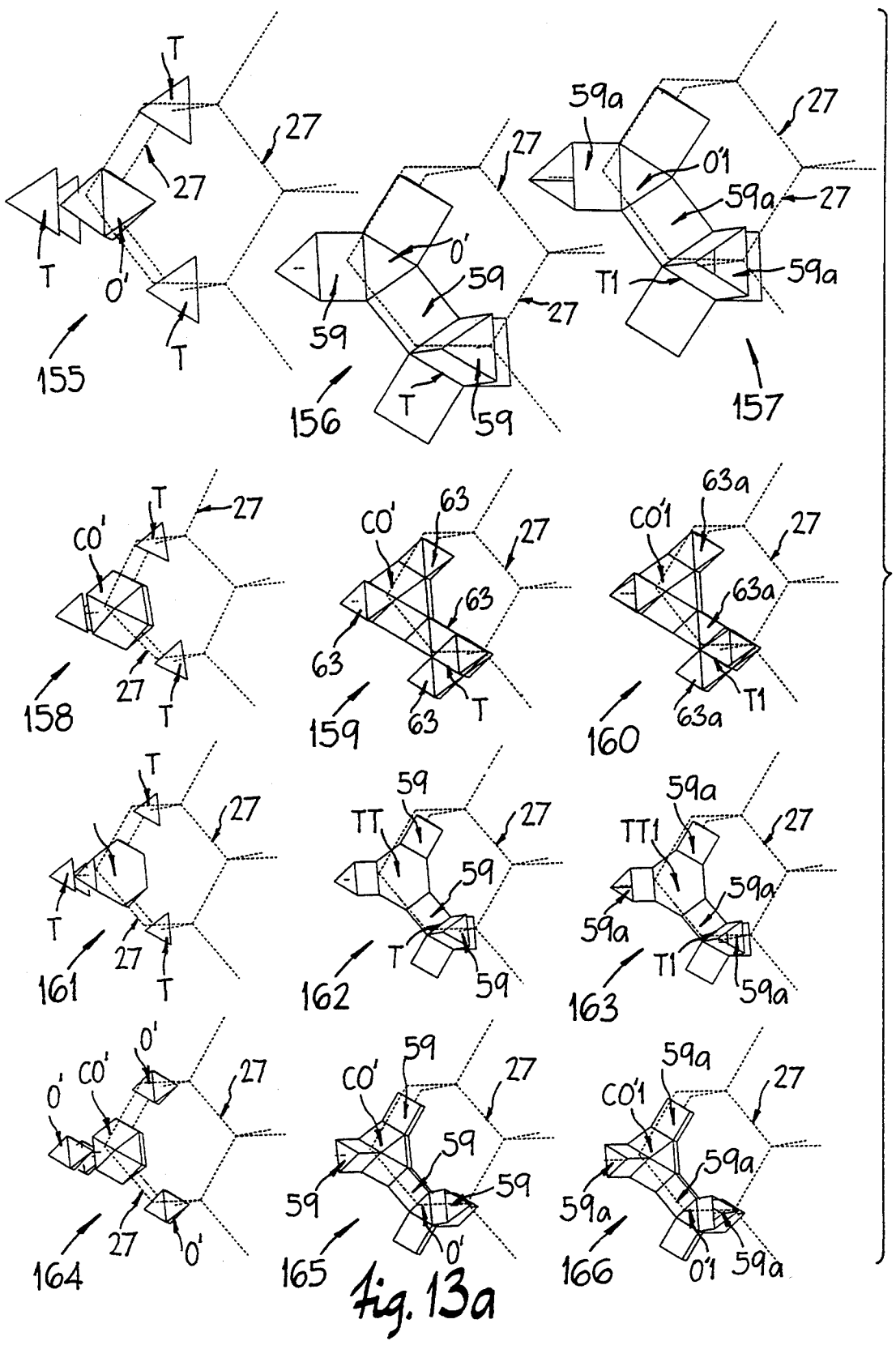
FIG. 13a and 13b show seven configurations and labyrinths based on grid Type F and obtained by pairing the polyhedra of tetrahedral symmetry.
Figure 13B:
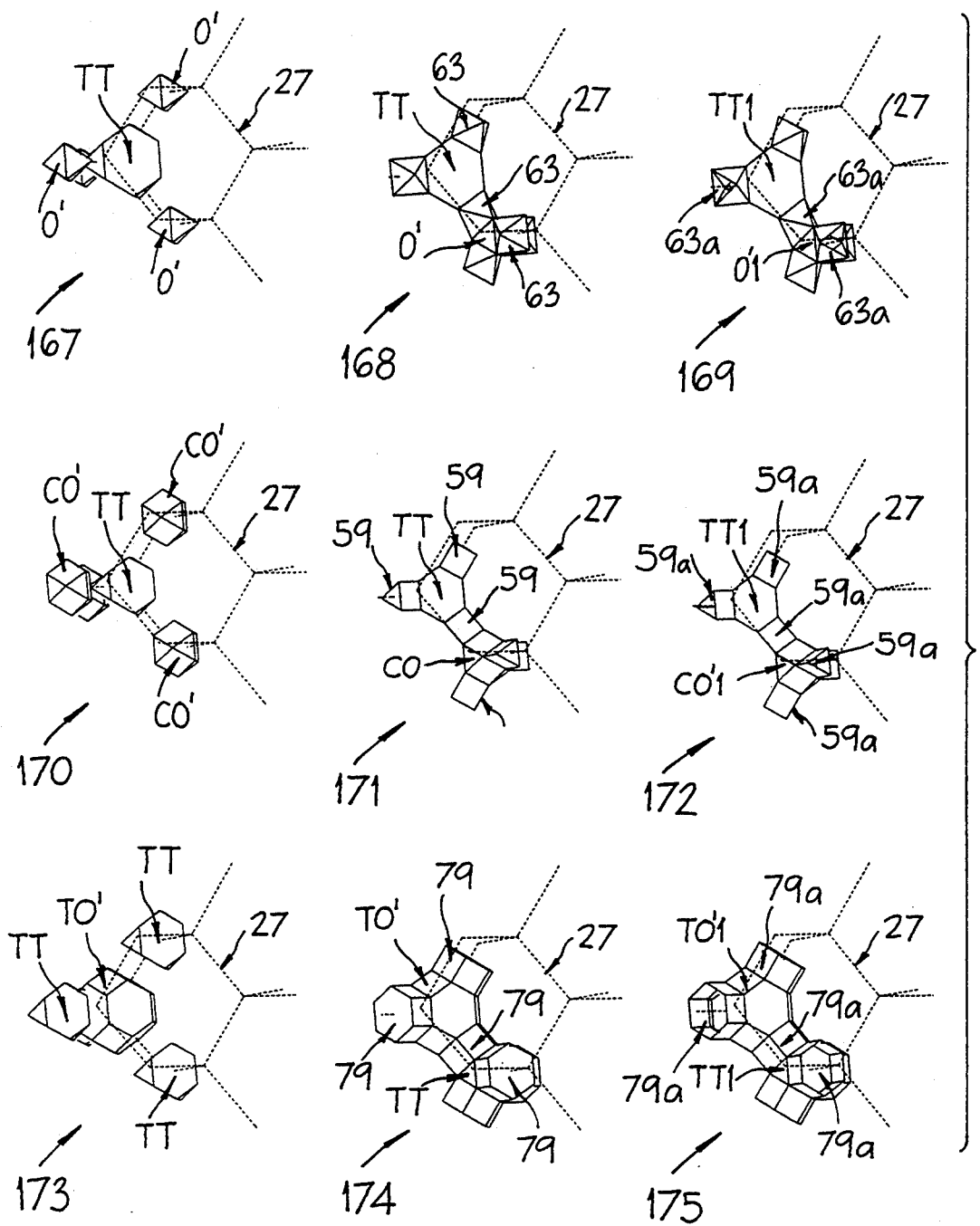
Figure 14:
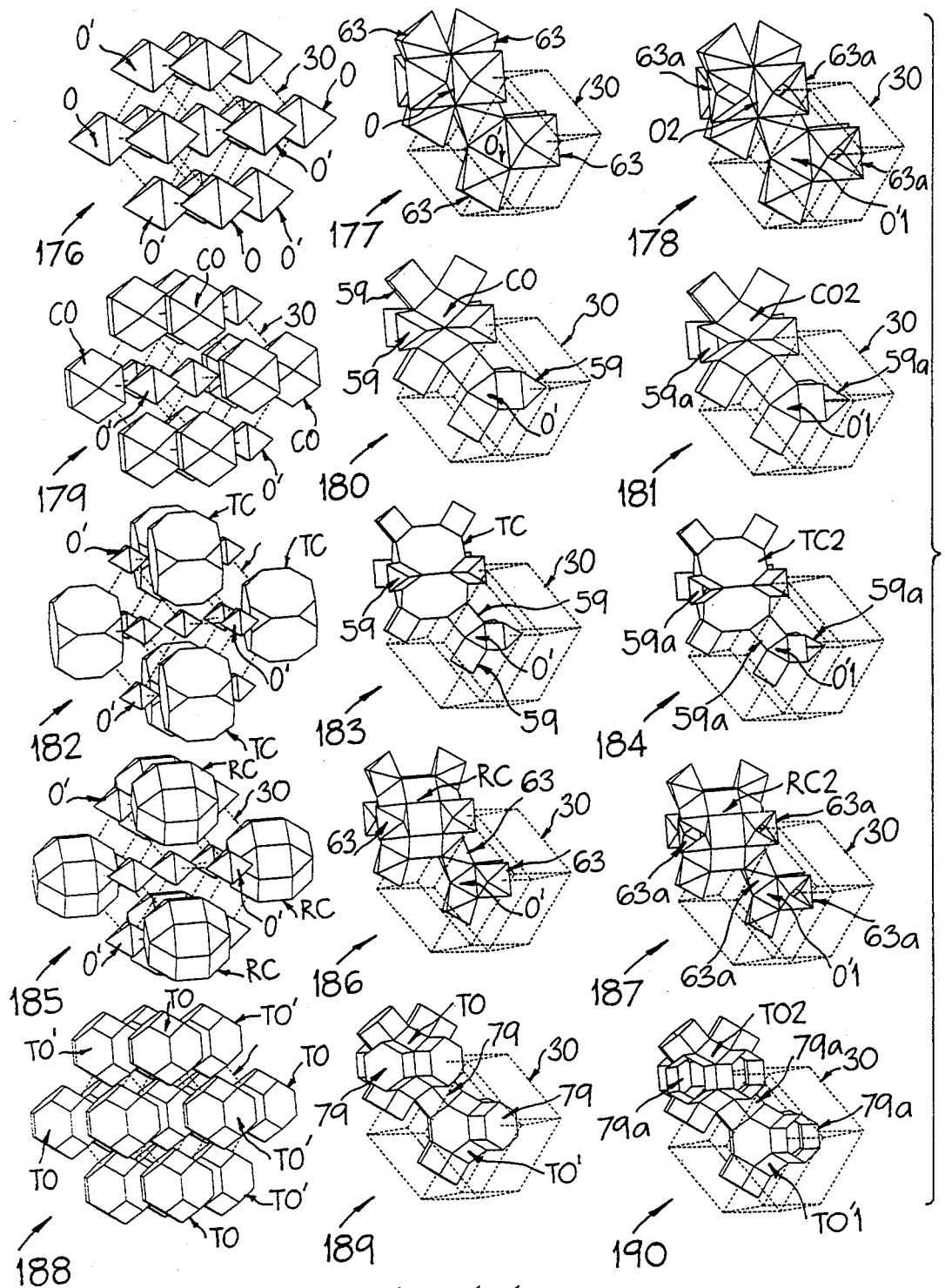
FIG. 14 shows five configurations and labyrinths based on grid Type G and obtained by pairing the polyhedra of tetrahedral and cubic symmetries.

Seven examples of configurations and labyrinths based on the diamond lattice and having two nodal polyhedra are described and illustrated in FIGS. 13a and 13b. The examples shown are restricted to prismatic and anti-prismatic connectors. The connections between adjacent polyhedra are along the 3-fold axes and in case of labyrinths the 3-fold faces are removed.

40. (FIG. 13a) The combination T-O' in 155, interconnected by triangular prisms 59 in 156. The labyrinth 142, composed of TT1 and TC2 connected with triangular prisms 59a, each with triangular faces removed.

41. The combination T-CO' in 158, interconnected by triangular anti-prisms 63 in 159. The labyrinth 160, composed of T1 and CO'1 connected with triangular anti-prisms 63a, each with triangular faces removed.

42. The combination T-TT in 161, interconnected by triangular prisms 59 in 162. The labyrinth 163, composed of T1 and TT1 connected with triangular prisms 59a, each with triangular faces removed.

43. The combination O'-CO' in 164, interconnected by triangular prisms 59 in 165. The labyrinth 166, composed of O'1 and CO'1 connected with triangular prisms 59a, each with triangular faces removed.

44. (FIG. 13b) The combination O'-TT in 167, interconnected by triangular anti-prisms 63 in 168. The labyrinth 169, composed of O'1 and TT1 connected with triangular anti-prisms 63a, each with triangular faces removed.

45. The combination CO'-TT in 170, interconnected by triangular prisms 59 in 171. The labyrinth 172, composed of CO'1 and TT1 connected with triangular prisms 59a, each with triangular faces removed.

46. The combination TO'-TT in 173, interconnected by hexagonal prisms 79 in 174. The labyrinth 175, composed of TO'1 and TT1 connected with hexagonal prisms 79, each with hexagonal faces removed.

6.7 Configurations from Grid Type H

Five examples of configurations and labyrinths based on grid Type H are described. The center of the rhombic dodecahedral unit and its eight 3-fold vertices provide locations for polyhedra from the tetrahedral symmetry. Of these, the center and four vertices in a tetrahedral relation have four edges per vertex and the alternating four vertices have eight edges per vertex. This means that the same polyhedron is placed in two different locations from the point of view of symmetry. The connector polyhedra radiating from the two locations are four and eight. The eight 4-fold vertices of the rhombic dodecahedral unit provide locations for cubic polyhedra. The connections are along the 3-fold axes of both families of polyhedra. In the case of labyrinths, the 3-fold faces are removed, as in the last two families of labyrinths above.

47. The combination O'-O in 176, interconnected by triangular anti-prisms 63 in 177. The labyrinth 178, composed of O'1 and O2 connected with triangular anti-prisms 63a, each with triangular faces removed.

48. The combination O'-CO in 179, interconnected by triangular prisms 59 in 180. The labyrinth 181, composed of O'1 and CO2 connected with triangular prisms 59a, each with triangular faces removed.

49. The combination O'-TC in 182, interconnected by triangular prisms 59 in 183. The labyrinth 184, composed of O'1 and TC2 connected with triangular prisms 59a, each with triangular faces removed.

50. The combination O'-RC in 185, interconnected by triangular anti-prisms 63 in 186. The labyrinth 189, composed of O'1 and RC2 connected with triangular anti-prisms 63a, each with triangular faces removed.

51. The combination TO'-TO in 188, interconnected by hexagonal prisms 79 in 189. The labyrinth 190, composed of TO'1 and TO2 connected with hexagonal prisms 79, each with hexagonal faces removed.

7. Space Labyrinths with Rotational Symmetries

Figure 15:
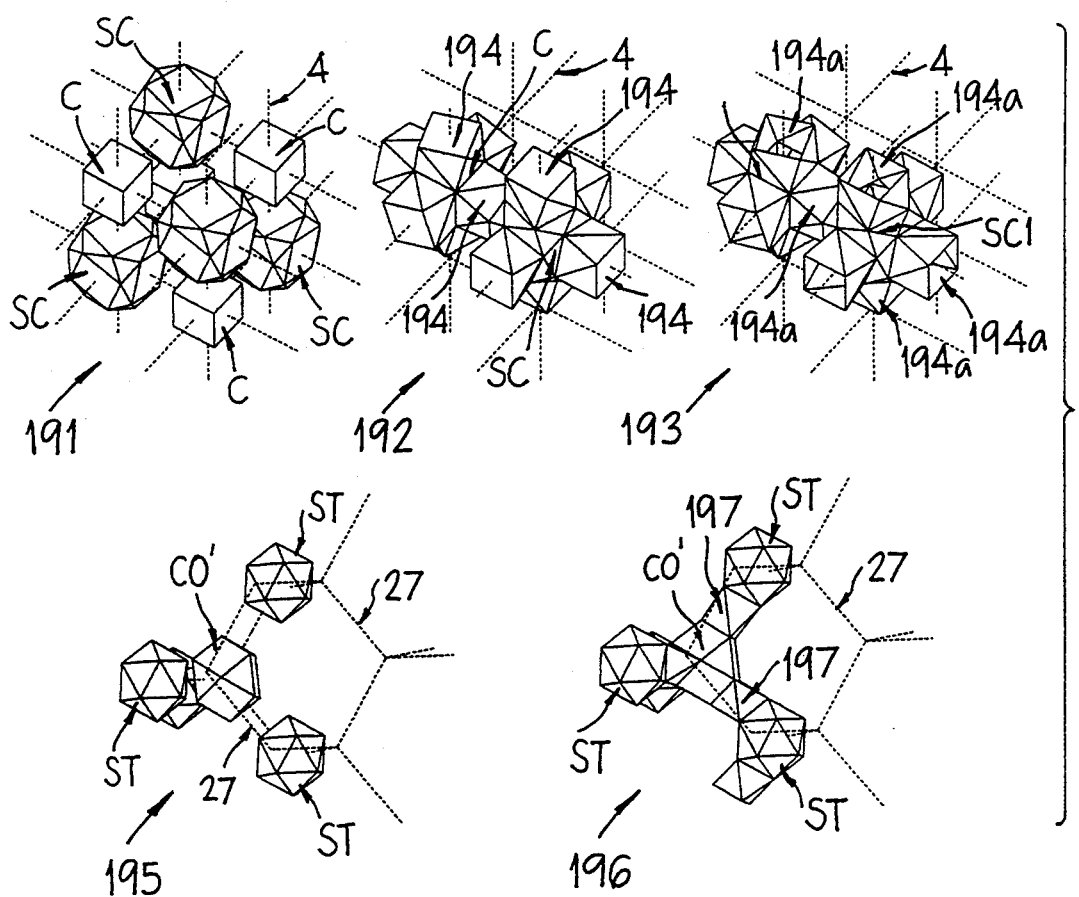
FIG. 15 shows two examples of configurations and labyrinths with snub (rotational) polyhedra.

Two examples of configurations with nodal polyhedra having rotational symmetry are shown in FIG. 15. The first is based on the cubic grid Type A, and the second is based on the diamond lattice, grid Type F. In 191, the snub cube SC is combined alternatingly with the cube C. In the derived configuration 192, the two nodal polyhedra are connected by a skewed (twisted) square antiprism 194. The related space labyrinth 193 has square faces removed and is composed of SC1 and C1 connected by and open-ended square anti-prism 194a. In 195, based on the diamond lattice, the nodal pair comprise the cuboctahedron CO' and a snub tetrahedron ST (also an icosahedron when all edges are equal). The derived configuration uses skewed triangular anti-prisms 197 as connector polyhedra. Other examples can be similarly derived. Other connectors include skewed half-cuboctahedra.

The snub cube and the snub tetrahedron do not need to have equal edge-lengths through the symmetry must be respected. The snub cube SC in 191–193 has unequal edges, though perfect cubic symmetry is retained. Here the triangles located at the 3-fold axes and the edges at the 2-fold axes are shrunken in size.

8. Other Connectors

Figure 16:
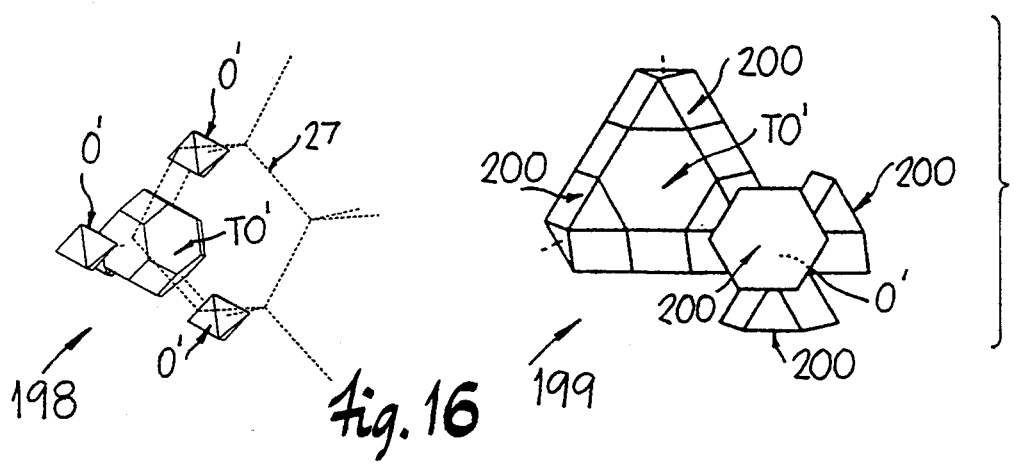
FIG. 16 shows one example of a configuration with a half-cuboctahedral connector.

FIG. 16 shows one example of another connector polyhedron. In 198, the nodal pair of truncated octahedra and octahedra and placed at the nodes of a portion of the diamond lattice. In 199, the two nodal polyhedra are connected by a half-cuboctahedral connector with a hexagonal base and a triangular top connected by three squares and three triangles. Other connectors include pyramids, e.g. connecting an octahedron with a cube.

9. Space Frames with Two Nodes

Corresponding to all the seven grids, and all the combinations of pairs of nodal polyhedra, space frames are derived by elongating the connector polyhedra. Two examples are shown in FIGS. 17a and 17b.

Figure 17A:
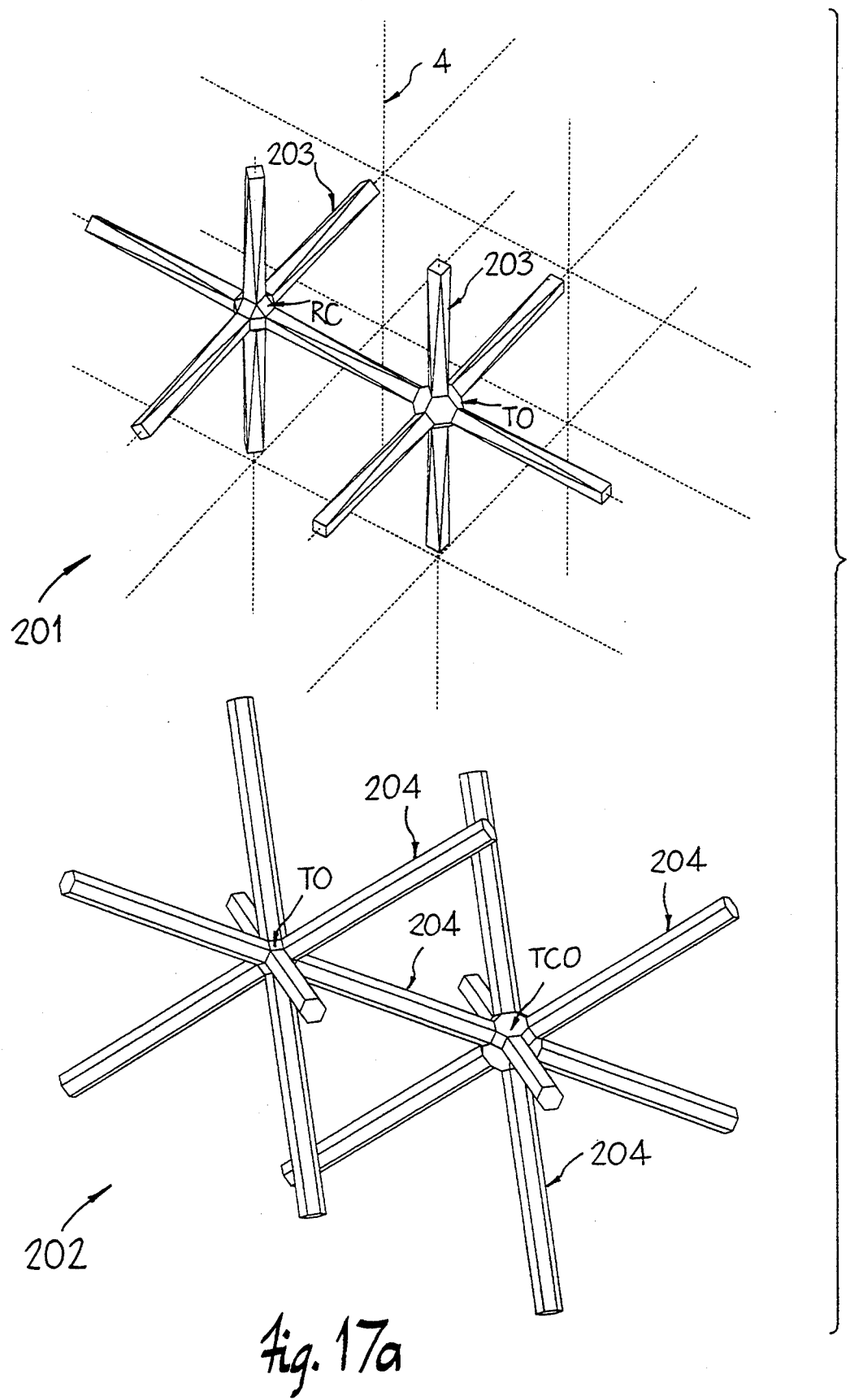
FIGS. 17a and 17b show two examples of space frames with two nodes.

In FIG. 17a, 201 shows two nodes of a space frame with two nodes, rhombicuboctahedron RC and truncated octahedron TO, connected by elongated anti-prisms 203. It is based on the cubic grid and corresponds to configuration 42 in FIG. 8b. 202 shows a portion of a space frame derived from grid Type B, the body-centred cubic lattice, and using the nodal pair truncated octahedron TCO and truncated octahedron TO and connected by elongated hexagonal prisms 204. This space frame is an elongated version of configuration 77 in FIG. 9b.

Figure 17B:
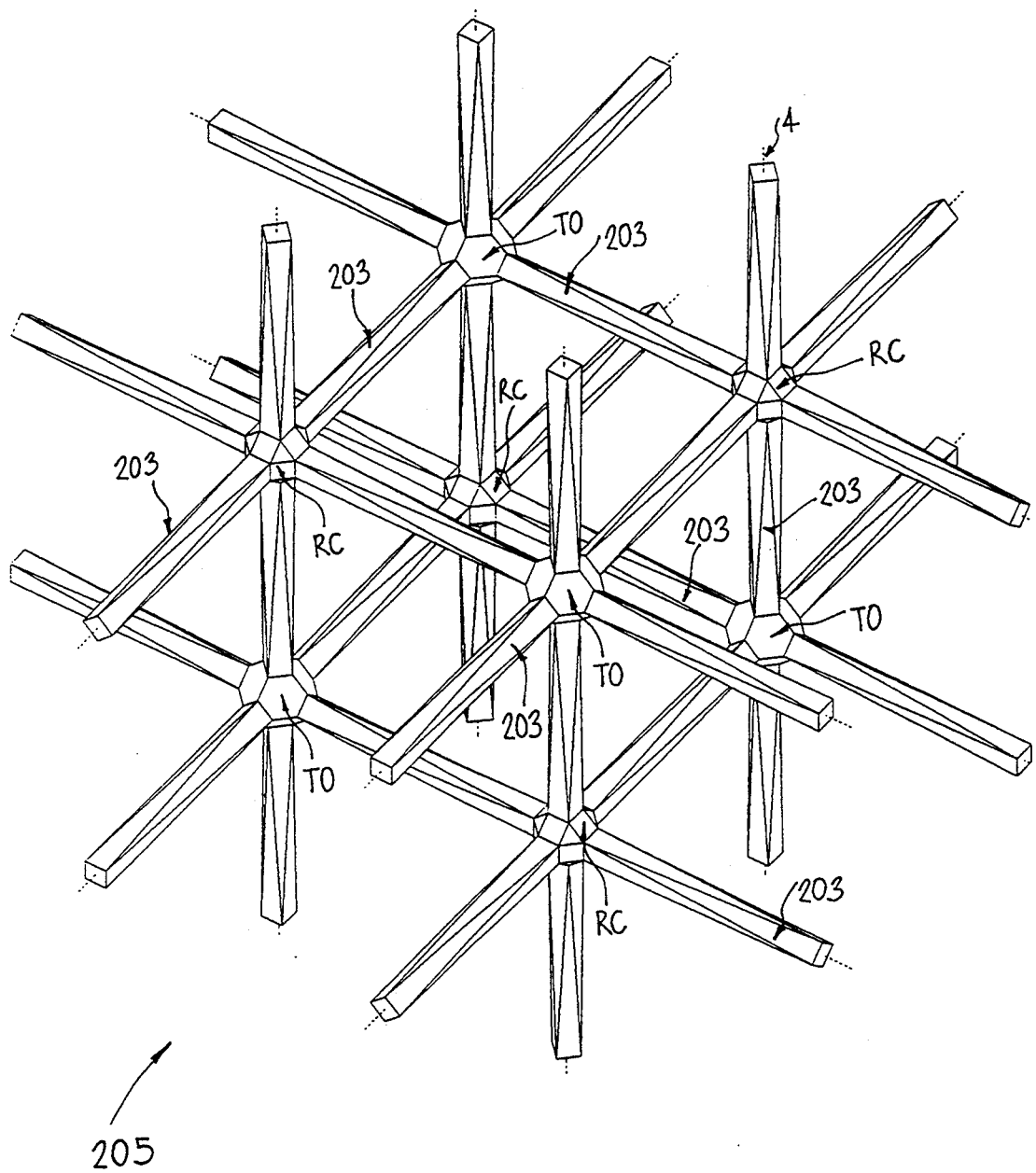

FIG. 17b shows one cubic region of the space frame combination shown in 201 of FIG. 17a. The space frame can easily be extended in any direction to permit a variety of architectural configurations. Other space frames can be similarly derived. The two different nodes provide space frames with a greater visual interest than one repeating node.

8. space-fillings

Figure 18:
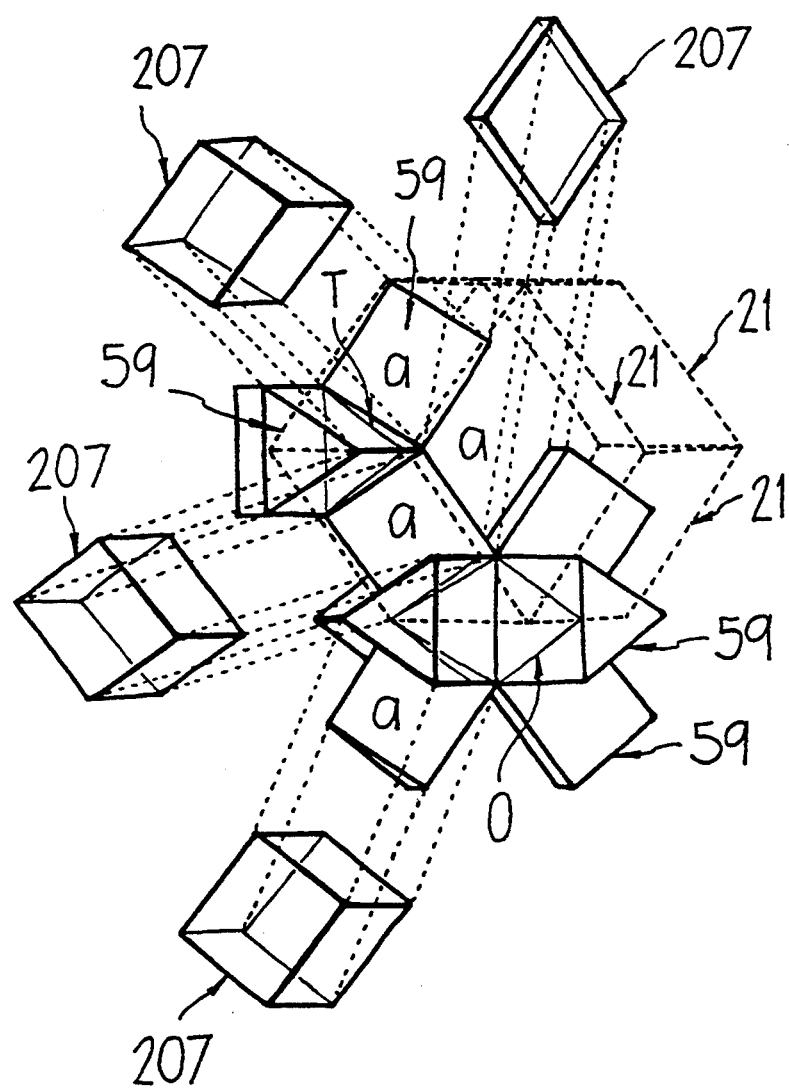
FIG. 18 shows the method of converting a configuration with two nodal polyhedra by filling-in the empty spaces with new cells.

The spaces in-between the nodal polyhedra and connector polyhedra can be filled in with filler cells to produce space-fillings which can be adapted for various design applications. One example is shown in FIG. 18. It is based on the configuration 96 of FIG. 12a. The original nodal polyhedra are tetrahedron T and octahedron O (shown in dotted lines) connected by triangular prisms 59. The filler cells 207 can be added in the empty spaces marked a between the connectors. The cells 207 are Miraldi prisms, with a face angle of 109°28'. To complete this space-filling, one additional cell, a rhombic dodecahedron (not shown) is required. This fits exactly at the center of the underlying rhombic dodecahedron (shown in dotted lines marked 21). This procedure of filling in the cells can be applied to any of the examples described. In some cases, like configurations with anti-prisms, non-convex interior cells are necessary. These can be broken down into smaller cells. Some other cases require saddle polygonal faces in combination with plane faces.

When converted into building systems, the labyrinths may be suitably modified. Some of the regular faces may be changed to non-regular faces as long as the symmetry of the faces are kept unchanged. For example, the square faces of the regular-faced polyhedra could be converted into rectangular faces. The hexagonal faces could have alternating sides of different lengths, keeping the face angles at 120°. The octagonal faces could similarly have two different edge-lengths. In a general sense, the symmetry and topology of the labyrinths and space-fillings could be retained, but the lengths of the edges could be changed to suitable lengths. The faces could be manufactured as panels, or plates, or frames where the faces are converted into planar rings. The panels could be attached to one another by physical, mechanical, electromagnetic, or any other means. The joints between panels could be hinged or rigid. The geometries could be converted into space frames with rigid nodes in cases where the faces are not triangular.

The space-fillings could be similarly modified and adapted to various design situations. These could be constructed as panels, rigid 3-dimensional modules, or space frames. Suitable physical, mechanical or other means of connecting the face panels, or edge struts could be devised. Cables or membranes could be introduced as necessary. From the space-fillings, various faces or parts of faces could be removed as per design needs. Faces could be interlinked through openings or cut-outs in the surfaces of the space-fillings.

The space frames derived from the space-fillings and labyrinths as disclosed herein, could be cast in one piece or made from several parts put together. The struts could be coupled to the nodes by any coupling or fastening device, mechanical, magnetic or other. Glued connections, welded joints, interlocking pieces, screws, pins, or other devices could be used. The node-strut connection could be like a male-female joint, a male-male or a female-female joint with a coupler piece. The nodes could depart from the shape of the specific polyhedron as long as the angles between struts are preserved. The struts could have other cross-sections, and could be polygonal, circular, or other. Both the nodes and the struts could be solid or hollow.

The labyrinths, space-fillings and space frames could be used for very large spans using multi-layered configurations derived from the configurations described herein. The layered configurations could be curved into large-size cylindrical vaults, spherical grid surfaces, hyperbolic paraboloids, paraboloids, hyperboloids, ellipsoids and other curved space structures.

What is claimed is:

1. Space structures for design applications comprising,
    a plurality of two different sets of polyhedra wherein each said polyhedron is composed of vertices, edges and faces
    where said first set of polyhedra alternates with said second set of polyhedra and
    where said two sets of polyhedra are joined by a third set of connector pieces
    each said connector piece comprising two opposite ends connected by a surface, wherein
    one said end of each said connector piece is connected to one said face of polyhedron of said first set and the other said end is connected to one said face of adjacent polyhedron of said second set
    where the lines joining the centers of adjacent said polyhedra define a periodic 3-dimensional space grid composed of source vertices and source edges, and
    where said polyhedra are defined by the symmetry of a tetrahedron cube or a square prism.

2. Space structures according to claim 1, wherein said space grids are derived from the simple cubic grid selected from the group comprising:
    Grid type A corresponding to the simple cubic grid itself, wherein each said source vertex is identical and has six said source edges radiating from every said source vertex at right angles,
    Grid type B corresponding to the body-centred cubic lattice, wherein each said source vertex is identical and has eight said source edges radiating from every said source vertex,
    Grid type C having two types of said source vertices, one set having twelve said source edges radiating from each said source vertex, and the other set having four said source edges radiating from each said source vertex,
    Grid type D having only one type of said source vertex with four co-planar said source edges radiating from it at right angles to one another.

3. Space structures according to claim 1, wherein said space grids are derived from the space-filling of rhombic dodecahedron and selected from the group comprising:
    Grid type E defined by the edges of a rhombic dodecahedron wherein said grid has two types of said source vertices, one set having eight said source edges radiating from each said source vertex and the other set having four said source edges meeting at each said source vertex,
    Grid type F corresponding to the diamond lattice having one type of said source vertex, wherein each said source vertex has four said source edges radiating from it, Grid type G defined by the edges of a close-packing of Miraldi rhombohedra, wherein each Miraldi rhombohedron is composed of six rhombic faces with the obtuse face angle of 109°28' and wherein said grid has two types of said source vertices, one said set having four said source edges radiating from each said source vertex and the other said set of said source vertices having eight said source edges radiating from each said source vertex.

4. Space structures according to claim 1,
wherein said polyhedra corresponding to symmetry of the cube are selected from the group comprising:
octahedron,
cube,
cuboctahedron,
truncated cube,
truncated octahedron,
rhombicuboctahedron,
truncated cuboctahedron, and
snub cube.

5. Space structures according to claim 1, wherein
said connector pieces are composed of faces, edges and vertices and selected from the group comprising:
3-sided, 4-sided, 6-sided and eight-sided prisms of any height,
3-sided and 4-sided anti-prisms of any height,
half-cuboctahedra of any height,
3-sided, 4-sided, 6-sided and eight-sided pyramids of any height, 3-sided or 4-sided skewed anti-prisms having rotational symmetry and of any height, and
skewed half-cuboctahedra having rotational symmetry.

6. Space structures according to claim 1, wherein
said polyhedra corresponding to symmetry of the tetrahedron are selected from the group comprising:
tetrahedron,
dual tetrahedron,
octahedron,
cuboctahedron,
truncated tetrahedron,
truncated dual-tetrahedron,
truncated octahedron, and
snub tetrahedron.

7. Space structures according to claim 1, wherein
said polyhedra corresponding to symmetry of the square prism are selected from the group comprising:
square prism and
octagonal prism.

8. Space structures according to claim 1, wherein
said polyhedra act as nodes of a space frame said connector pieces act as struts of said space frame, wherein
said struts are coupled to said nodes through attachment means.

9. Space structures according to claim 1, wherein
said surface of said connector pieces define the surface of a space labyrinth which divides space into inside and outside.

10. Space structures according to claim 1, wherein
said surface of said connector pieces along with some faces of said polyhedra define the surface of a space labyrinth which divides space into inside and outside.

11. Space structures according to claim 1, wherein
said polyhedra and said connector pieces are hollow.

12. Space structures according to claim 5, wherein
said edges of said connector pieces are equal to the edges of said polyhedra.

13. Space structures according to claim 1, wherein
the space around said polyhedra and said connector pieces is filled in with additional polyhedral blocks.

* * * * *